United States Patent
Hironishi

(10) Patent No.: US 9,768,907 B2
(45) Date of Patent: Sep. 19, 2017

(54) OPTICAL TRANSMISSION APPARATUS AND WAVELENGTH CALIBRATION METHOD

(71) Applicant: FUJITSU LIMITED, Kawasaki-shi, Kanagawa (JP)

(72) Inventor: Kazuo Hironishi, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/871,965

(22) Filed: Sep. 30, 2015

(65) Prior Publication Data
US 2016/0149647 A1 May 26, 2016

(30) Foreign Application Priority Data

Nov. 21, 2014 (JP) .................................. 2014-236398

(51) Int. Cl.
*H04J 14/02* (2006.01)
*H04B 10/077* (2013.01)

(52) U.S. Cl.
CPC ...... *H04J 14/0284* (2013.01); *H04B 10/0775* (2013.01)

(58) Field of Classification Search
USPC .......................................................... 398/25
See application file for complete search history.

(56) References Cited

U.S. PATENT DOCUMENTS

| 4,742,576 A | 5/1988 | McMahon | |
|---|---|---|---|
| 5,774,243 A | 6/1998 | Majima | |
| 5,867,289 A * | 2/1999 | Gerstel | H04B 10/038 398/12 |
| 6,043,883 A * | 3/2000 | Leckel | G01J 9/0246 356/454 |
| 2010/0150578 A1* | 6/2010 | Fukao | H04B 10/572 398/192 |

FOREIGN PATENT DOCUMENTS

| JP | 62-159929 | 7/1987 |
|---|---|---|
| JP | 8-65268 | 3/1996 |
| JP | 9-162849 | 6/1997 |
| JP | 9-252283 | 9/1997 |

* cited by examiner

*Primary Examiner* — David Payne
*Assistant Examiner* — Omar S Ismail
(74) *Attorney, Agent, or Firm* — Fujitsu Patent Center

(57) ABSTRACT

An optical transmission apparatus, includes: a reference-wavelength light source configured to generate reference light; a reference wavemeter configured to be calibrated by using the reference light; a receiver configured to receive measurement light transmitted from another optical transmission apparatus and wavelength information about the measurement light; and a controller, wherein the controller configured to: detect error between a first wavelength of the measurement light detected by using the reference wavemeter, and a second wavelength included in the wavelength information; and send error information that represents the error to the another optical transmission apparatus.

14 Claims, 21 Drawing Sheets

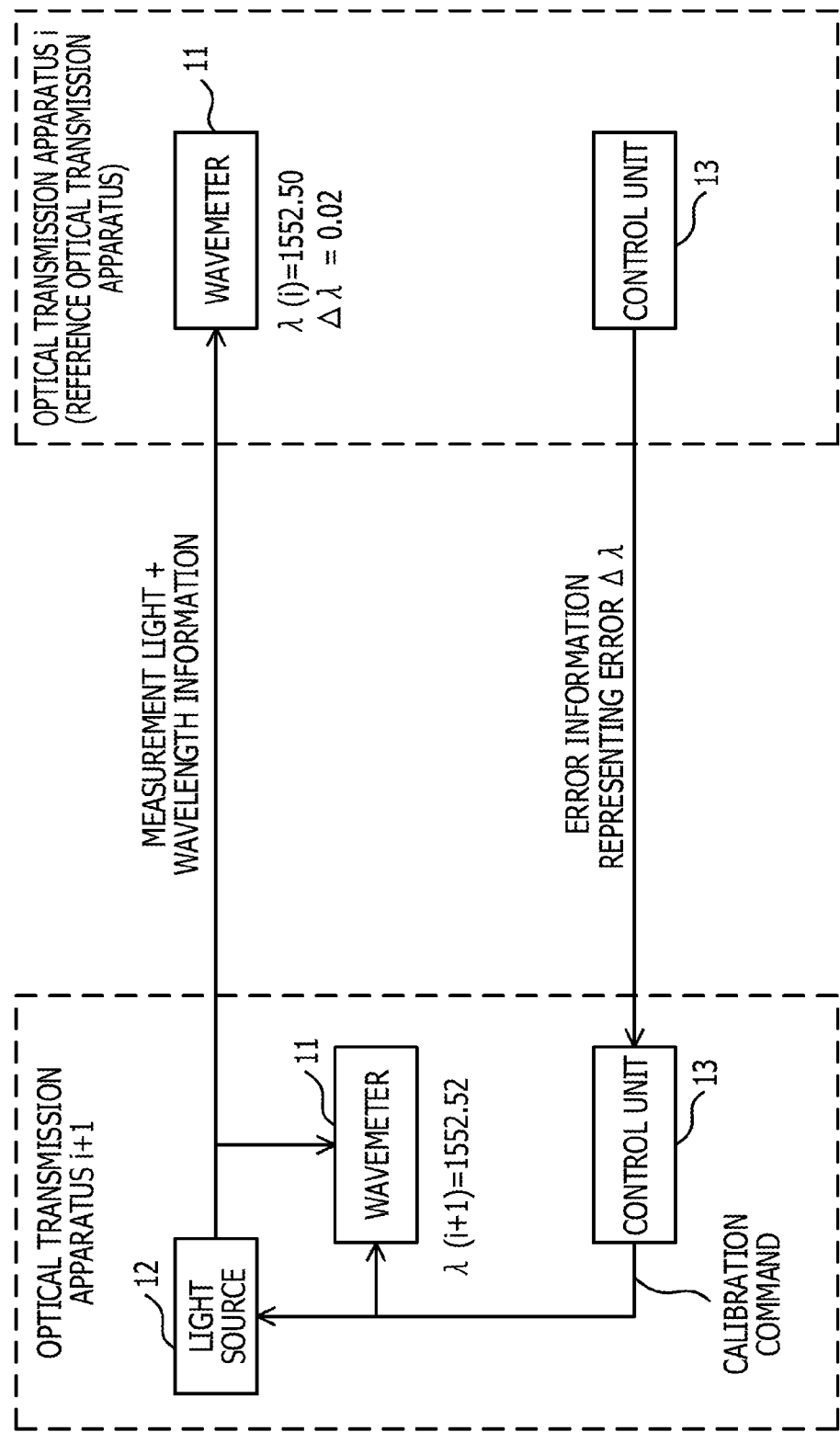

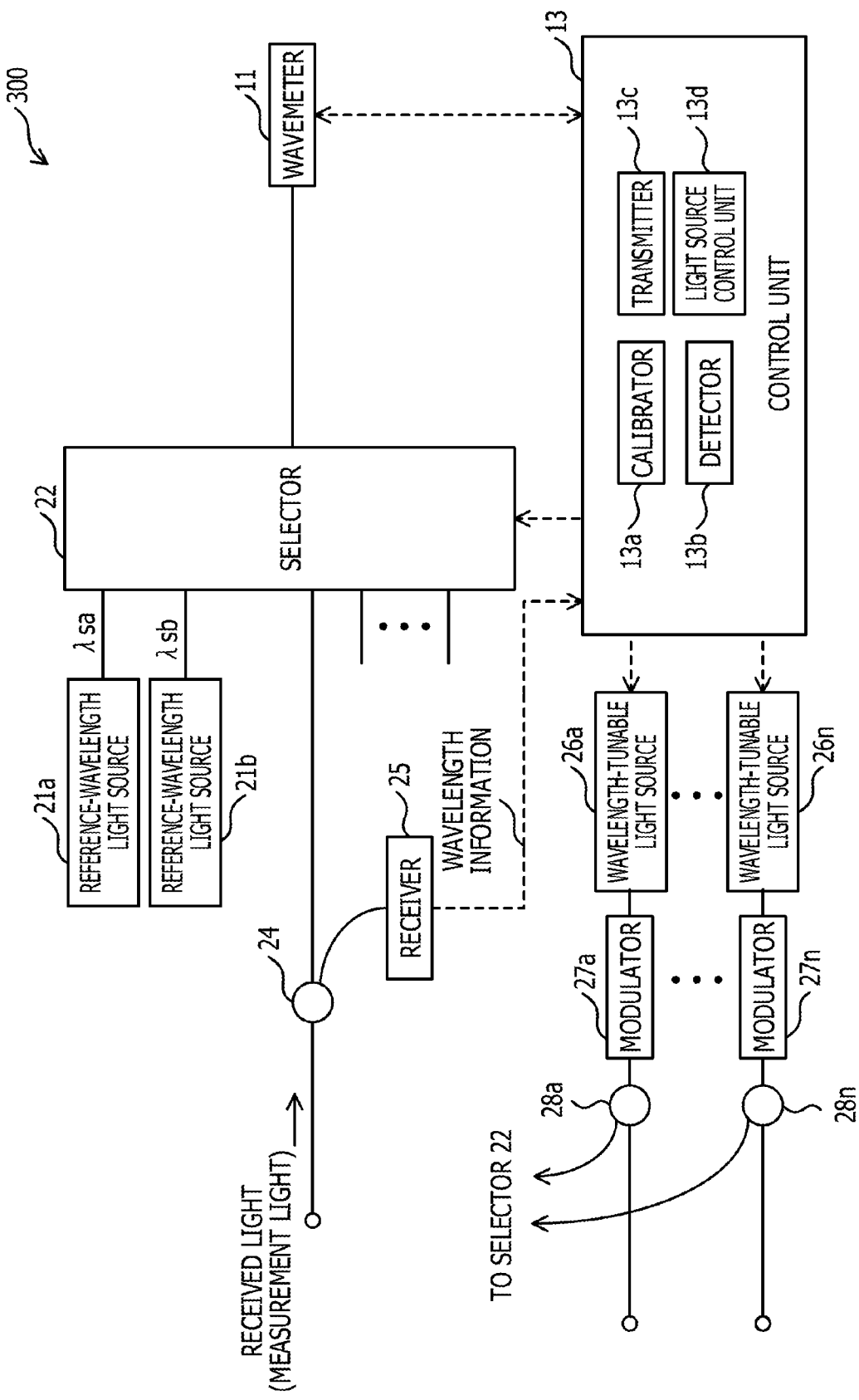

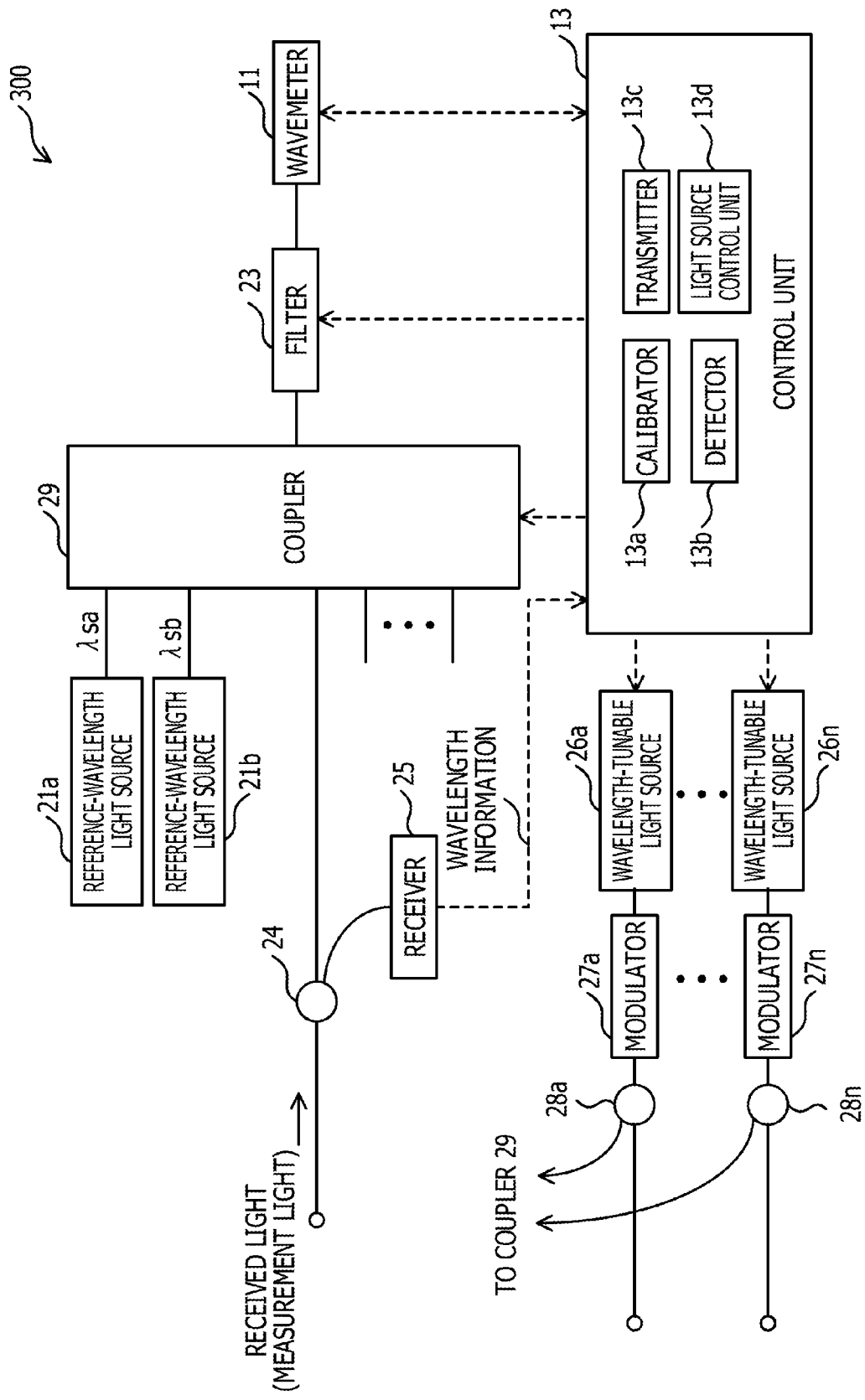

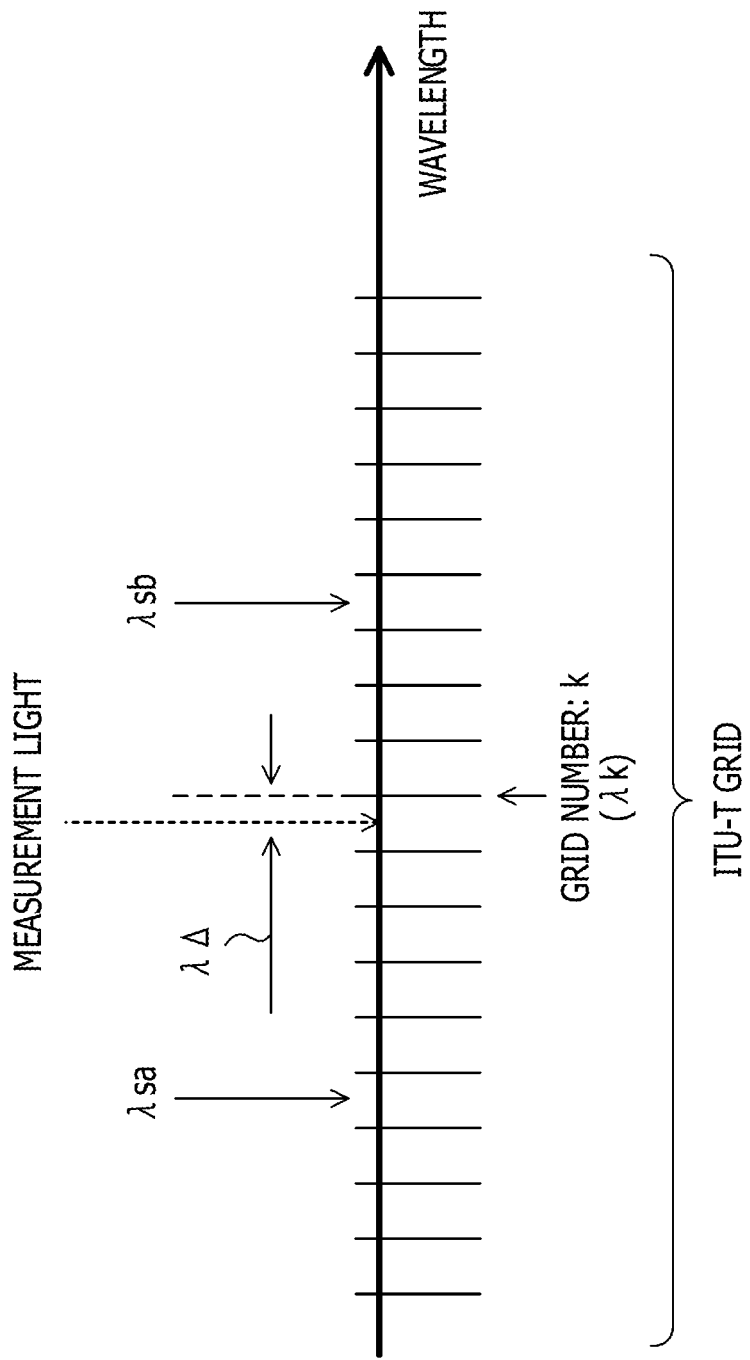

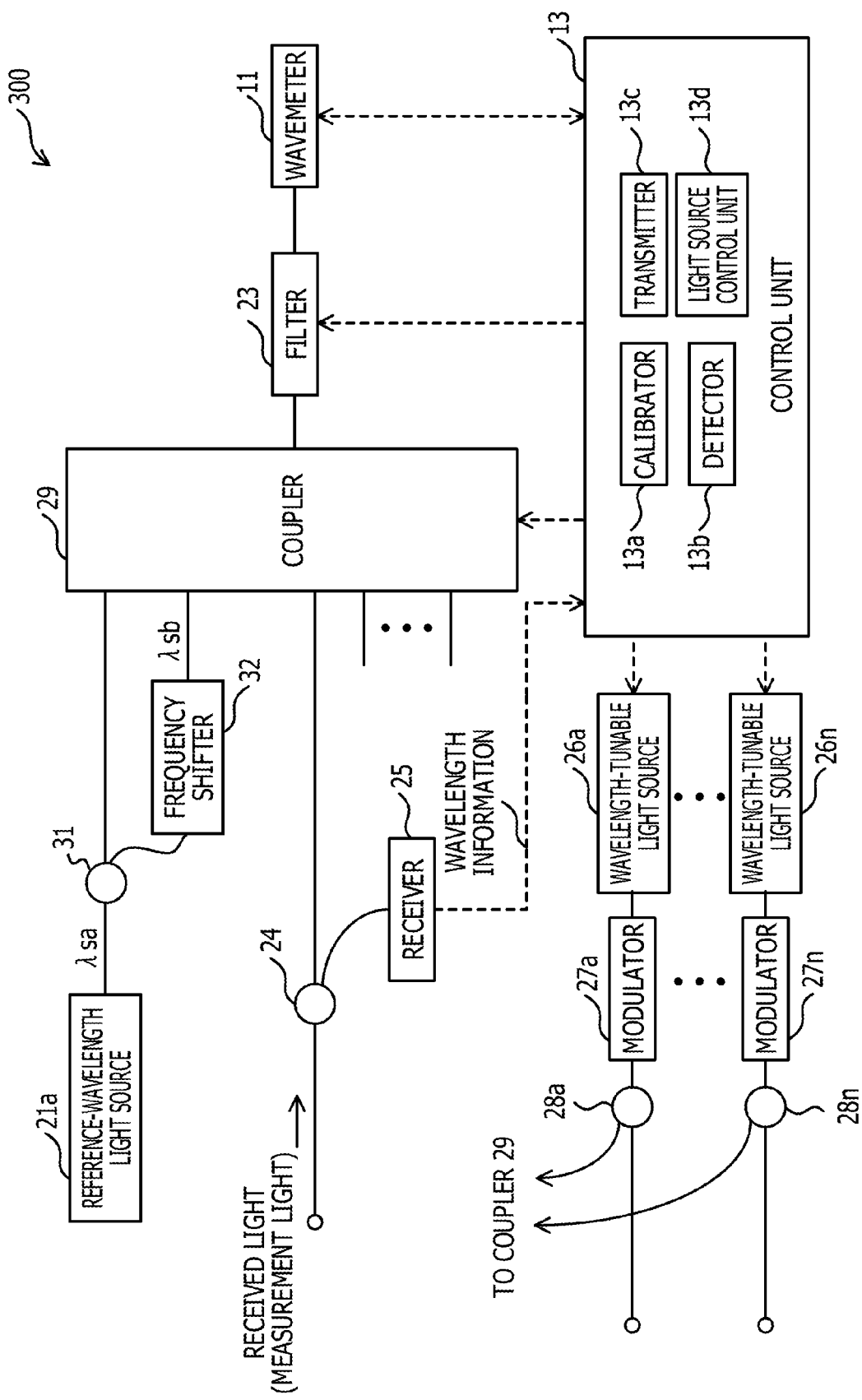

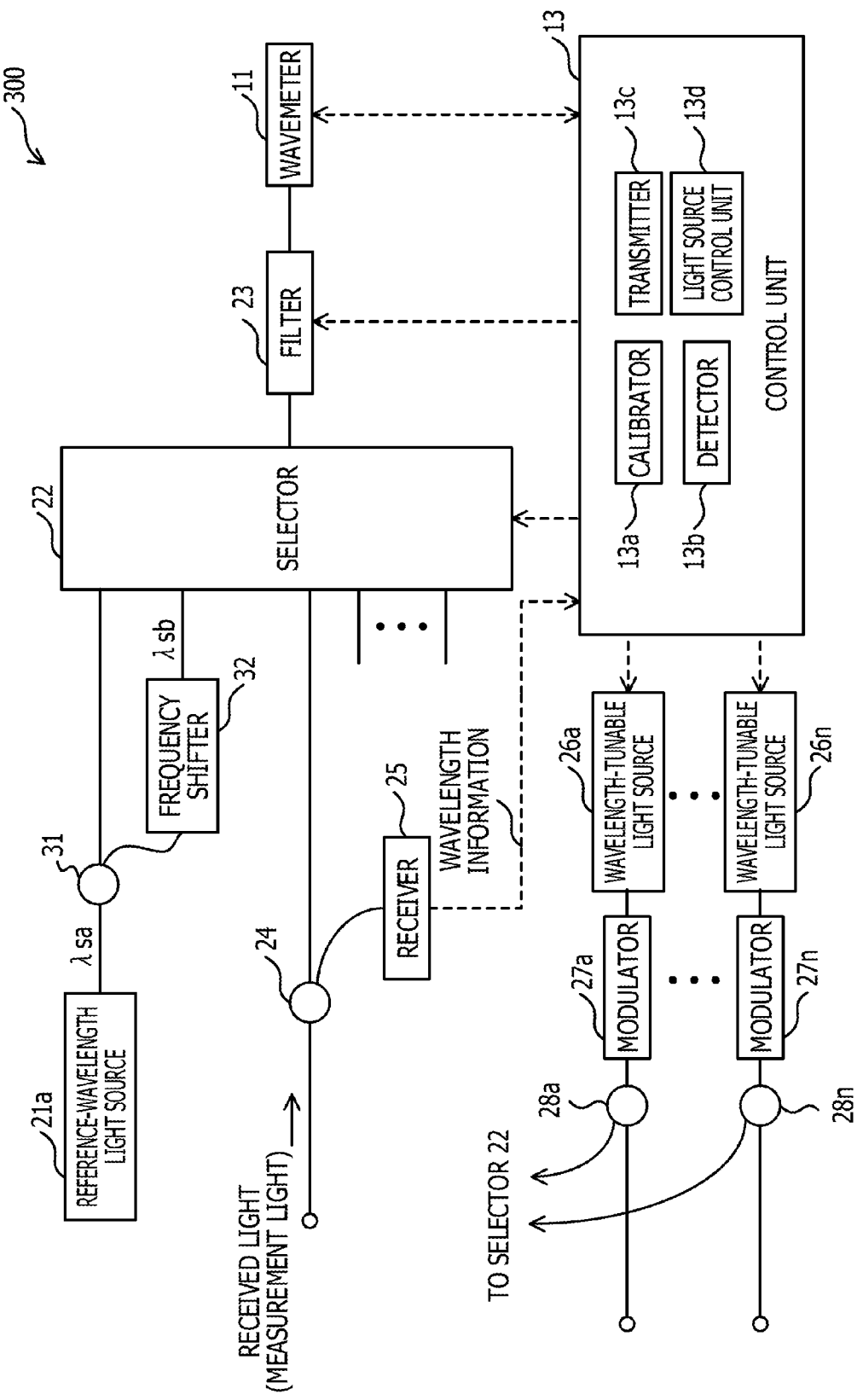

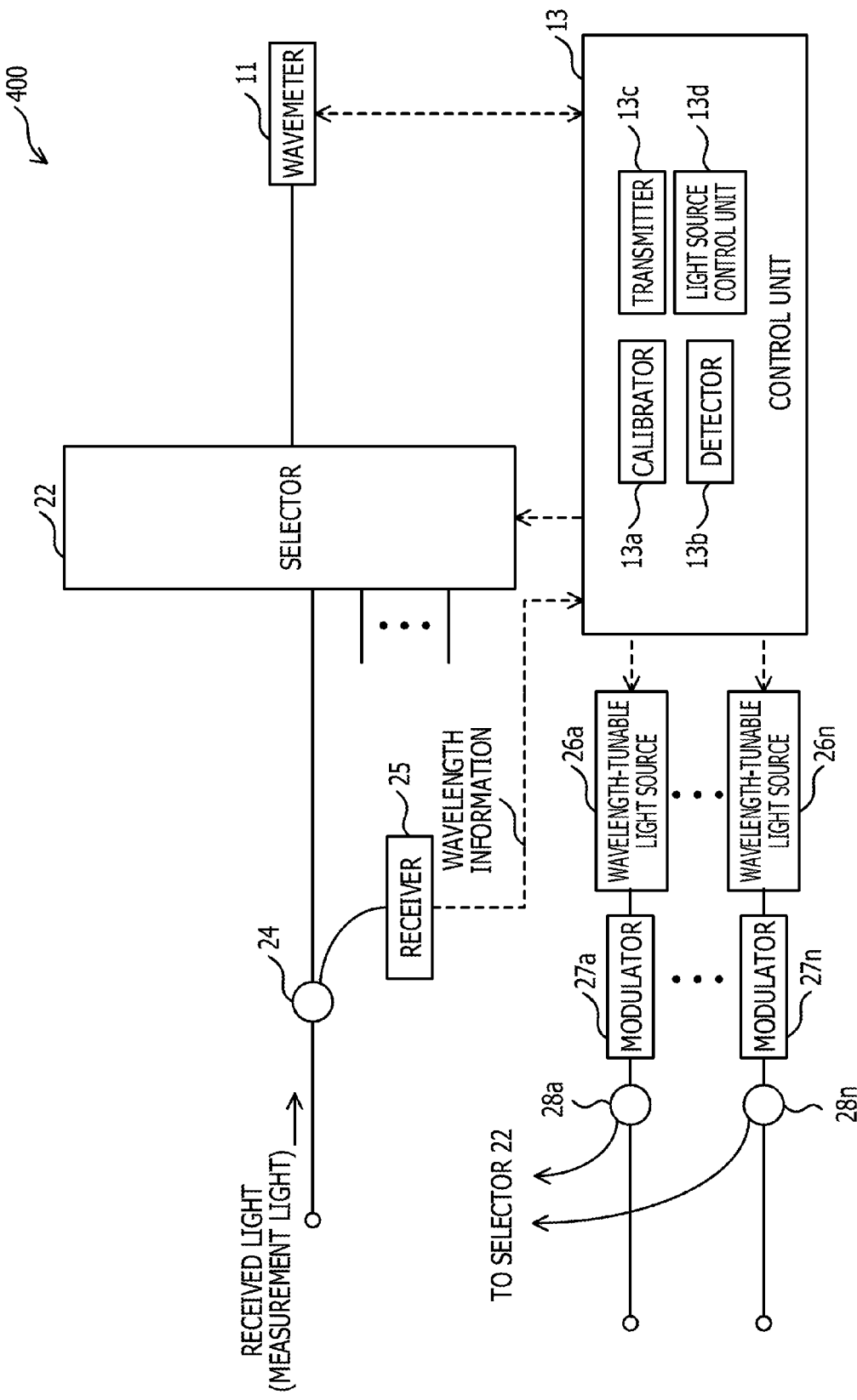

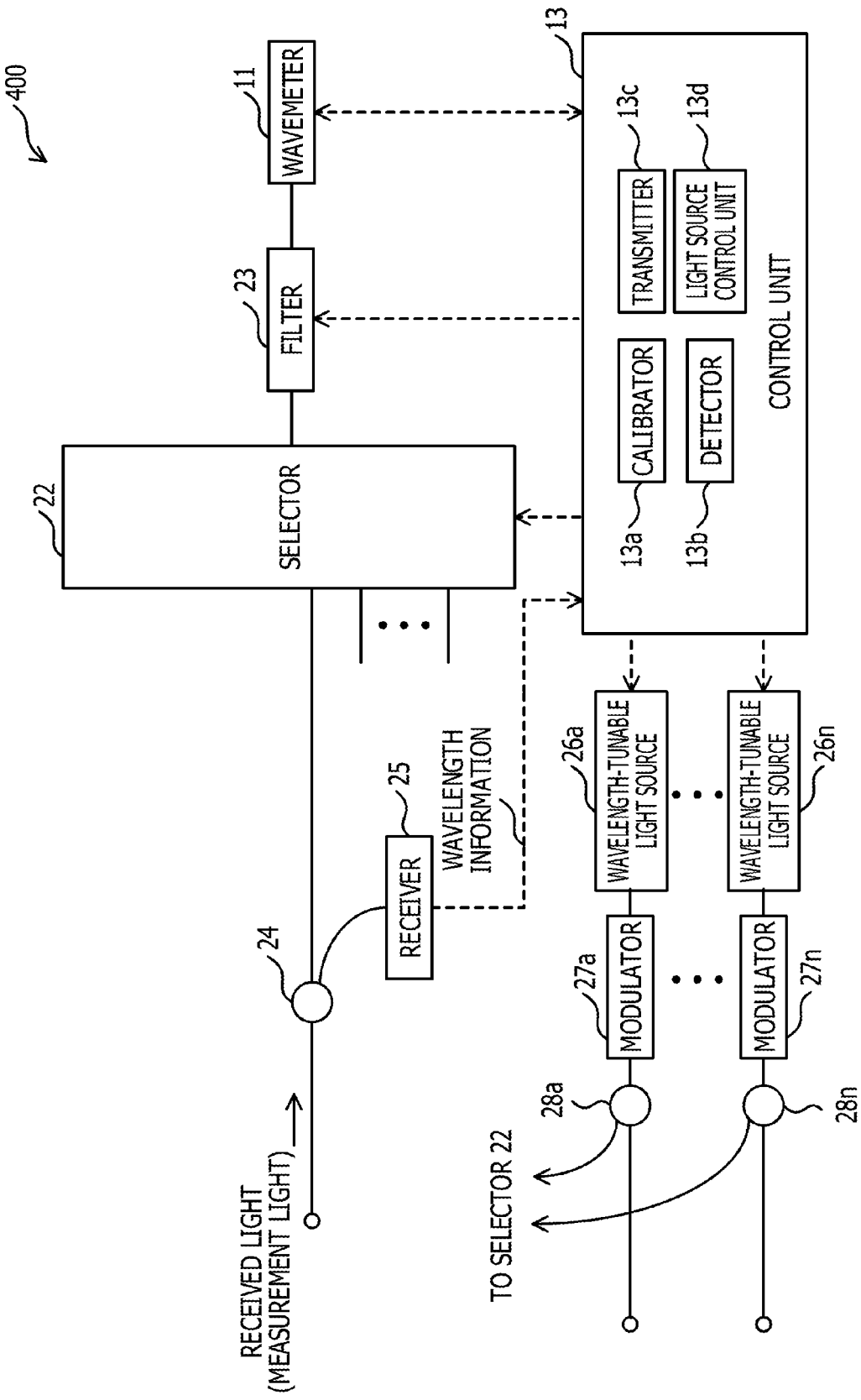

OPTICAL TRANSMISSION APPARATUS AND WAVELENGTH CALIBRATION METHOD

CROSS-REFERENCE TO RELATED APPLICATION

This application is based upon and claims the benefit of priority of the prior Japanese Patent Application No. 2014-236398, filed on Nov. 21, 2014, the entire contents of which are incorporated herein by reference.

FIELD

The embodiments discussed herein are related to an optical transmission apparatus and a wavelength calibration method.

BACKGROUND

A modulation method with high frequency usage efficiency such as Super channels and Nyquist channels is practically used.

A related technology is disclosed in Japanese Laid-open Patent Publication No. 62-159929, Japanese Laid-open Patent Publication No. 8-65268, Japanese Laid-open Patent Publication No. 9-162849, or Japanese Laid-open Patent Publication No. 9-252283.

SUMMARY

According to an aspect of the embodiments, an optical transmission apparatus, includes: a reference-wavelength light source configured to generate reference light; a reference wavemeter configured to be calibrated by using the reference light; a receiver configured to receive measurement light transmitted from another optical transmission apparatus and wavelength information about the measurement light; and a controller, wherein the controller configured to: detect error between a first wavelength of the measurement light detected by using the reference wavemeter, and a second wavelength included in the wavelength information; and send error information that represents the error to the another optical transmission apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 illustrates an example of a wavelength calibration method;

FIGS. 5A to 5C each illustrate an example of a reference optical transmission apparatus;

FIG. 6 illustrates an example of a measurement error detection method;

FIGS. 7A to 7C each illustrate an example of a reference optical transmission apparatus;

FIGS. 9A to 9C each illustrate an example of an optical transmission apparatus;

DESCRIPTION OF EMBODIMENTS

In an optical network in which a modulation method with high frequency usage efficiency is used, if the wavelength of each optical signal has not been appropriately adjusted, interference may occur between optical signals. In this case, signal quality may be deteriorated and the bit error ratio may be increased. In an optical network, therefore, it is desirable for the wavelength of an optical signal, for example, an optical frequency, to have been precisely adjusted.

A node in an optical network includes a wavelength selective switch, which switches a path for each wavelength without the optical signal being altered, so it is desirable for wavelength precision to be improved.

If a wavelength used in an optical network has not been precisely adjusted, it suffices to provide a highly precise optical source in each transmission apparatus in the optical network. In this structure, a cost to create the optical network may be increased.

Figure 1:
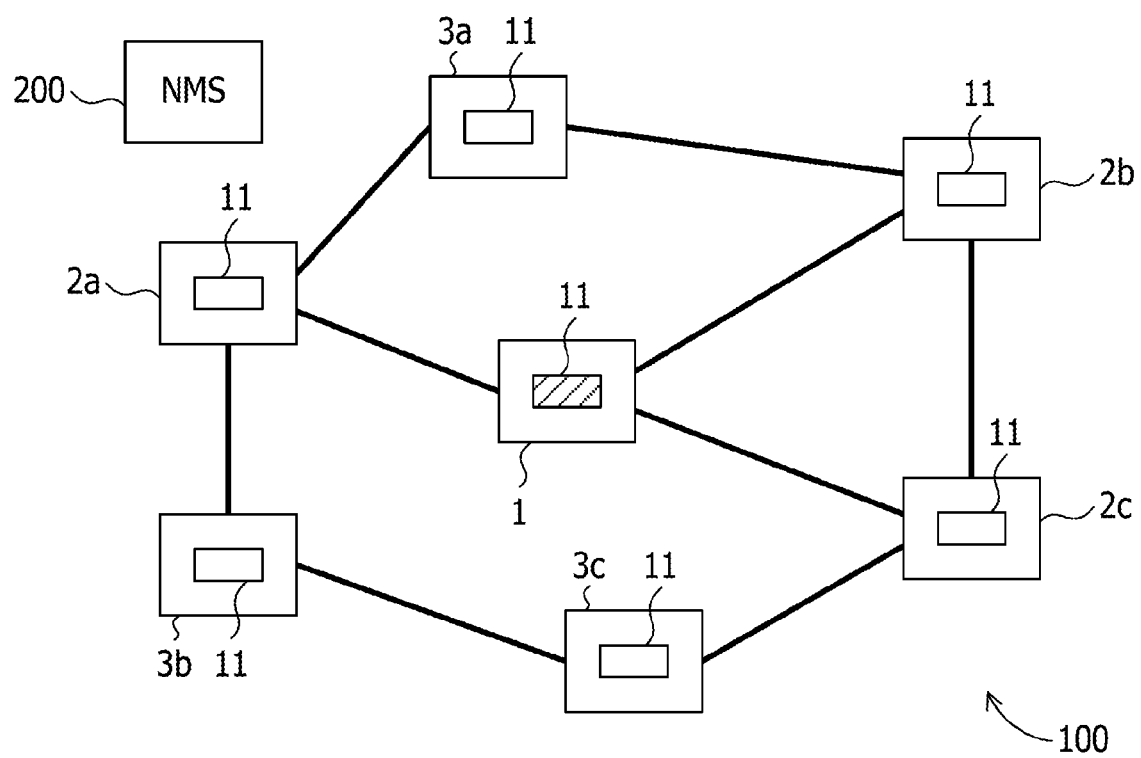
FIG. 1 illustrates an example of an optical network system.

FIG. 1 illustrates an example of an optical network system. As illustrated in FIG. 1, the optical network system 100 has a plurality of nodes (1, 2a to 2c, and 3a to 3c). In each node, an optical transmission apparatus is provided. In the description below, optical transmission apparatuses provided in the nodes 1, 2a, 2b, 2c, 3a, 3b, and 3c may be respectively referred to as the optical transmission apparatuses 1, 2a, 2b, 2c, 3a, 3b, and 3c.

The optical network system 100 transmits a WDM signal. Optical signals multiplexed into a WDM signal are placed in, for example, an ITU-T frequency grid. In an ITU-T frequency grid, optical signals are arrayed at 12.5-GHz, 25-GHz, 50-GHz, or 100-GHz intervals. An ITU-T frequency grid at 50-GHz intervals, for example, is represented as in the equation below, in which k is a grid number, k being an integer (including 0). Frequency=193.1+k×0.05 [THz]. In this case, when k=0, for example, an approximate nominal center wavelength of 1552.5244 nm is obtained.

In the description below, there may be no distinction between the frequency grid and the wavelength grid. Even for frequency grids at a frequency interval that differs from the ITU-T frequency grid or frequency grids at non-uniform frequency intervals, if a quantitative comparison with the ITU-T frequency grid is possible, the following technology may also be applied to these frequency grids.

The optical transmission apparatus provided in each node in the optical network system 100 has a plurality of wavelength-tunable light sources to create a WDM signal and send it. The wavelength-tunable light sources in each optical transmission apparatus are adjusted so that optical signals in an ITU-T frequency grid are transmitted. For example, each optical transmission apparatus adjusts relevant wavelength-tunable light sources so that the wavelengths of individual optical signals are arrayed in an ITU-T frequency grid.

A network management system (NMS) 200 manages the optical network system 100. For example, the network management system 200 controls the optical transmission apparatus provided in each node. For example, the network management system 200 controls the optical transmission apparatus provided in the relevant node so that a path requested by the user is set. For example, the network management system 200 relays control data transmitted between nodes. For example, the network management system 200 may be coupled so that it can communicate with each optical transmission apparatus.

Each optical transmission apparatus has a wavemeter 11. The optical transmission apparatus creates an optical signal with a specified wavelength by adjusting the wavelength-tunable light source by using the wavemeter 11 in the own optical transmission apparatus. Therefore, the wavemeter 11 in each optical transmission apparatus has been preferably calibrated.

In the optical network system 100, the optical transmission apparatus 1 may have a reference-wavelength light source that is more frequency-stable than other light sources. The optical transmission apparatus 1 calibrates the wavemeter 11 in the optical transmission apparatus 1 by using the reference-wavelength light source. In the description below, to distinguish the optical transmission apparatus 1 from other optical transmission apparatuses, the optical transmission apparatus 1 may be referred to as the reference optical transmission apparatus. In FIG. 1, a calibrated wavemeter 11, for example, the wavemeter 11 in the optical transmission apparatus 1, is represented by a hatched area.

Figure 2A:
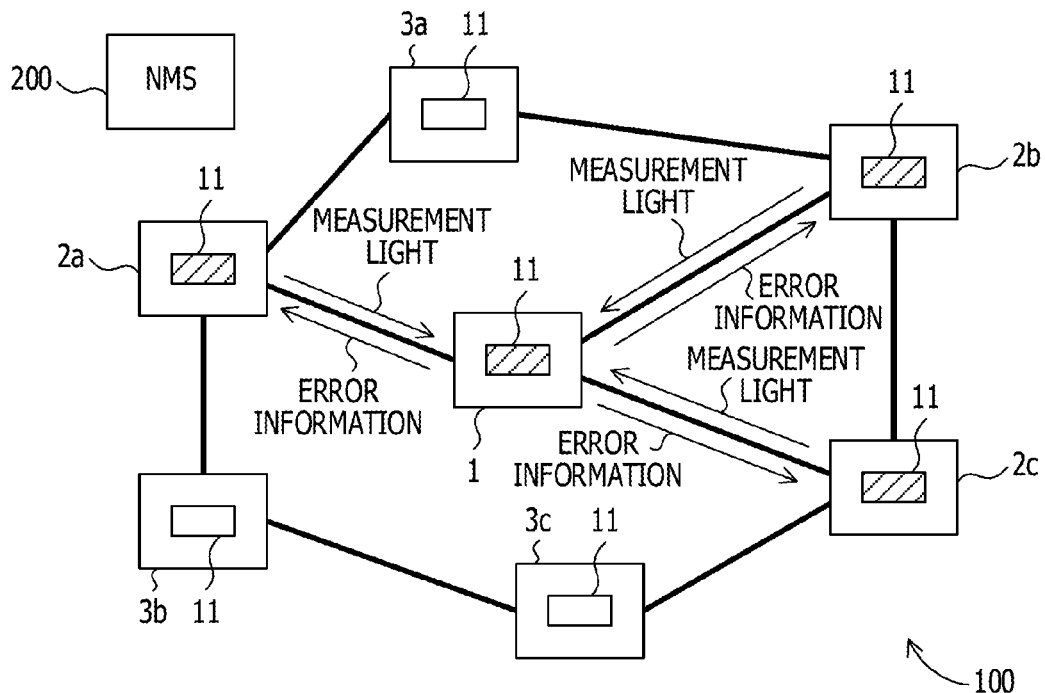
FIGS. 2A and 2B each illustrate an example of a wavelength calibration method.
Figure 2B:
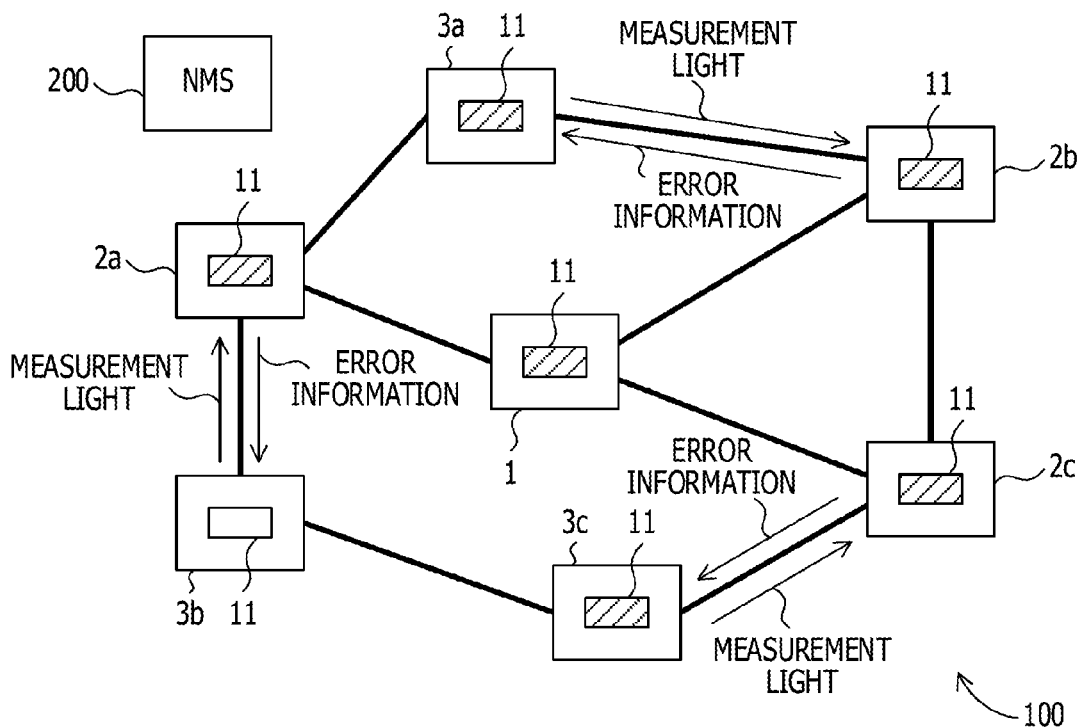

FIGS. 2A and 2B each illustrate an example of a wavelength calibration method. In the optical network system 100 illustrated in FIG. 1, for example, the wavemeter 11 in the optical transmission apparatus provided in each node is calibrated.

The optical transmission apparatuses 2a to 2c may be coupled directly to the optical transmission apparatus 1 through optical fiber transmission paths. For example, the optical transmission apparatuses 2a to 2c may send an optical signal to the optical transmission apparatus 1 without the optical signal being relayed by another optical transmission apparatus and may receive an optical signal from the optical transmission apparatus 1 without the optical signal being relayed by another optical transmission apparatus.

The optical transmission apparatuses 2a to 2c calibrate the relevant wavemeter 11 in the optical transmission apparatuses 2a to 2c by using the optical transmission apparatus 1, and adjusts the relevant wavelength-tunable light sources in the optical transmission apparatuses 2a to 2c by using the calibrated wavemeter 11. For example, the wavemeter 11 in the optical transmission apparatus 2a may be calibrated.

The optical transmission apparatus 2a creates measurement light and sends it to the optical transmission apparatus 1, as illustrated in FIG. 2A. At that time, the optical transmission apparatus 2a measures the wavelength of the measurement light by using the wavemeter 11 in the optical transmission apparatus 2a, and sends a measurement result to the optical transmission apparatus 1. The measurement result by the optical transmission apparatus 2a may be sent to the optical transmission apparatus 1 by, for example, using the measurement light. The optical transmission apparatus 1 may be notified of the measurement result by the optical transmission apparatus 2a by using the network management system 200. At this point in time, the wavemeter 11 in the optical transmission apparatus 2a may not have been calibrated. Therefore, the measurement result by the optical transmission apparatus 2a may include error.

The optical transmission apparatus 1 measures the wavelength of the measurement light received from the optical transmission apparatus 2a. The wavemeter 11 in the optical transmission apparatus 1 has been calibrated in advance by using the reference-wavelength light source. A measurement result by the optical transmission apparatus 1 may correctly represent the wavelength of the received measurement light. The optical transmission apparatus 1 detects error between the measurement result by the wavemeter 11 in the optical transmission apparatus 2a and the measurement result by the wavemeter 11 in the optical transmission apparatus 1. The optical transmission apparatus 1 sends error information that represents the error to the optical transmission apparatus 2a. The error information may be transmitted through, for example, an optical fiber transmission path that mutually couples the optical transmission apparatus 1 and optical transmission apparatus 2a. For example, the optical transmission apparatus 2a may be notified of the error information by using the network management system 200.

The optical transmission apparatus 2a calibrates the wavemeter 11 in the optical transmission apparatus 2a according to the error information. The optical transmission apparatus 2a may adjust the wavelength-tunable light sources in the optical transmission apparatus 2a by using the calibrated wavemeter 11. For example, the optical transmission apparatus 2a may adjust wavelength of a transmission optical signal by using the calibrated wavemeter 11. The optical transmission apparatuses 2b and 2c may calibrate the wavemeter 11 in the same way. For example, as indicated by the hatched areas in FIG. 2A, the wavemeters 11 in the optical transmission apparatuses 2a to 2c are calibrated.

As described above, the wavemeters 11 in the optical transmission apparatuses 2a to 2c are calibrated by using the reference optical transmission apparatus, for example, the optical transmission apparatus 1. In the description below, the optical transmission apparatuses 2a to 2c may be referred to as the secondary reference optical transmission apparatuses. The secondary reference optical transmission apparatus may be used to calibrate the wavemeters 11 in other optical transmission apparatuses, as with the reference optical transmission apparatus.

The optical transmission apparatuses 3a to 3c are not coupled directly to the optical transmission apparatus 1. For example, the optical transmission apparatuses 3a to 3c are coupled to the secondary reference optical transmission apparatuses through optical fiber transmission paths. For example, the optical transmission apparatus 3a is coupled to the optical transmission apparatuses 2a and 2b, the optical transmission apparatus 3b is coupled to the optical transmission apparatus 2a, and the optical transmission apparatus 3c is coupled to the optical transmission apparatus 2c. The optical transmission apparatuses 3a to 3c calibrate the relevant wavemeter 11 in the optical transmission apparatuses 3a to 3c by using the corresponding secondary reference optical transmission apparatus, and adjust the relevant wavelength-tunable light sources in the optical transmission apparatuses 3a to 3c by using the calibrated wavemeter 11. For example, the wavemeter 11 in the optical transmission apparatus 3a may be calibrated.

The optical transmission apparatus 3a creates measurement light and sends it to the optical transmission apparatus 2b, as illustrated in FIG. 2B. At that time, the optical transmission apparatus 3a measures the wavelength of the measurement light by using the wavemeter 11 in the optical transmission apparatus 3a, and sends a measurement result to the optical transmission apparatus 2b. The measurement result by the optical transmission apparatus 3a may be sent to the optical transmission apparatus 2b by, for example, using the measurement light. For example, the optical transmission apparatus 2b may be notified of the measurement result by the optical transmission apparatus 3a by using the network management system 200. At this point in time, the wavemeter 11 in the optical transmission apparatus 3a may not have been calibrated. Therefore, the measurement result by the optical transmission apparatus 3a may include error.

The optical transmission apparatus 2b measures the wavelength of the measurement light received from the optical transmission apparatus 3a. The wavemeter 11 in the optical transmission apparatus 2b has already been calibrated by using the optical transmission apparatus 1, as illustrated in FIG. 2A. For example, a measurement result by the optical transmission apparatus 2b correctly represents the wavelength of the received measurement light. The optical transmission apparatus 2b detects error between the measurement result by the wavemeter 11 in the optical transmission apparatus 3a and the measurement result by the wavemeter 11 in the optical transmission apparatus 2b. The optical transmission apparatus 2b sends error information that represents the error to the optical transmission apparatus 3a. The error information may be transmitted, for example, through an optical transmission path that mutually couples the optical transmission apparatus 2b and optical transmission apparatus 3a. For example, the optical transmission apparatus 3a may be notified of the error information by using the network management system 200.

The optical transmission apparatus 3a calibrates the wavemeter 11 in the optical transmission apparatus 3a according to the error information. The optical transmission apparatus 3a may adjust wavelength-tunable light sources in the optical transmission apparatus 3a by using the calibrated wavemeter 11. For example, the optical transmission apparatus 3a may adjust the wavelength of a transmission optical signal by using the calibrated wavemeter 11. The optical transmission apparatuses 3b and 3c may calibrate the wavemeter 11 in the same way. For example, the wavemeters 11 in the optical transmission apparatuses 3a to 3c are calibrated as indicated by the hatched areas in FIG. 2B.

As described above, the wavemeters 11 in the optical transmission apparatuses 3a to 3c are calibrated by using the secondary reference optical transmission apparatuses, for example, the optical transmission apparatuses 2a to 2c. In the description below, the optical transmission apparatuses 3a to 3c may be referred to as the tertiary reference optical transmission apparatuses. The tertiary reference optical transmission apparatus may be used to calibrate the wavemeters 11 in other optical transmission apparatuses, as with the reference optical transmission apparatus or secondary reference optical transmission apparatus.

Calibration in each node may be performed at a different time. In FIG. 2A, for example, the wavemeters 11 in the optical transmission apparatuses 2a to 2c may be calibrated at different times. In FIG. 2B, for example, the wavemeters 11 in the optical transmission apparatuses 3a to 3c may be calibrated at different times. In these cases, the wavelengths of the measurement light sent from the optical transmission apparatuses 2a to 2c and 3a to 3c may be substantially the same. Calibration of the wavemeters 11 in the optical transmission apparatuses 2a to 2c and 3a to 3c may be started in response to, for example, a command from the network management system 200.

In FIG. 2A, for example, if the wavelengths of the measurement light used by the optical transmission apparatuses 2a to 2c differ from each other, the wavemeters 11 in the optical transmission apparatuses 2a to 2c may be calibrated in parallel. In FIG. 2B, for example, if the wavelengths of the measurement light used by the optical transmission apparatuses 3a to 3c differ from each other, the wavemeters 11 in the optical transmission apparatuses 3a to 3c may be calibrated in parallel.

The wavemeter 11 in each node may be calibrated by using measurement light rays with different wavelengths. In this case, error is detected for each measurement light ray and the wavemeter 11 is calibrated according to the average of the error. In this method, calibration precision may be improved.

Figure 3:
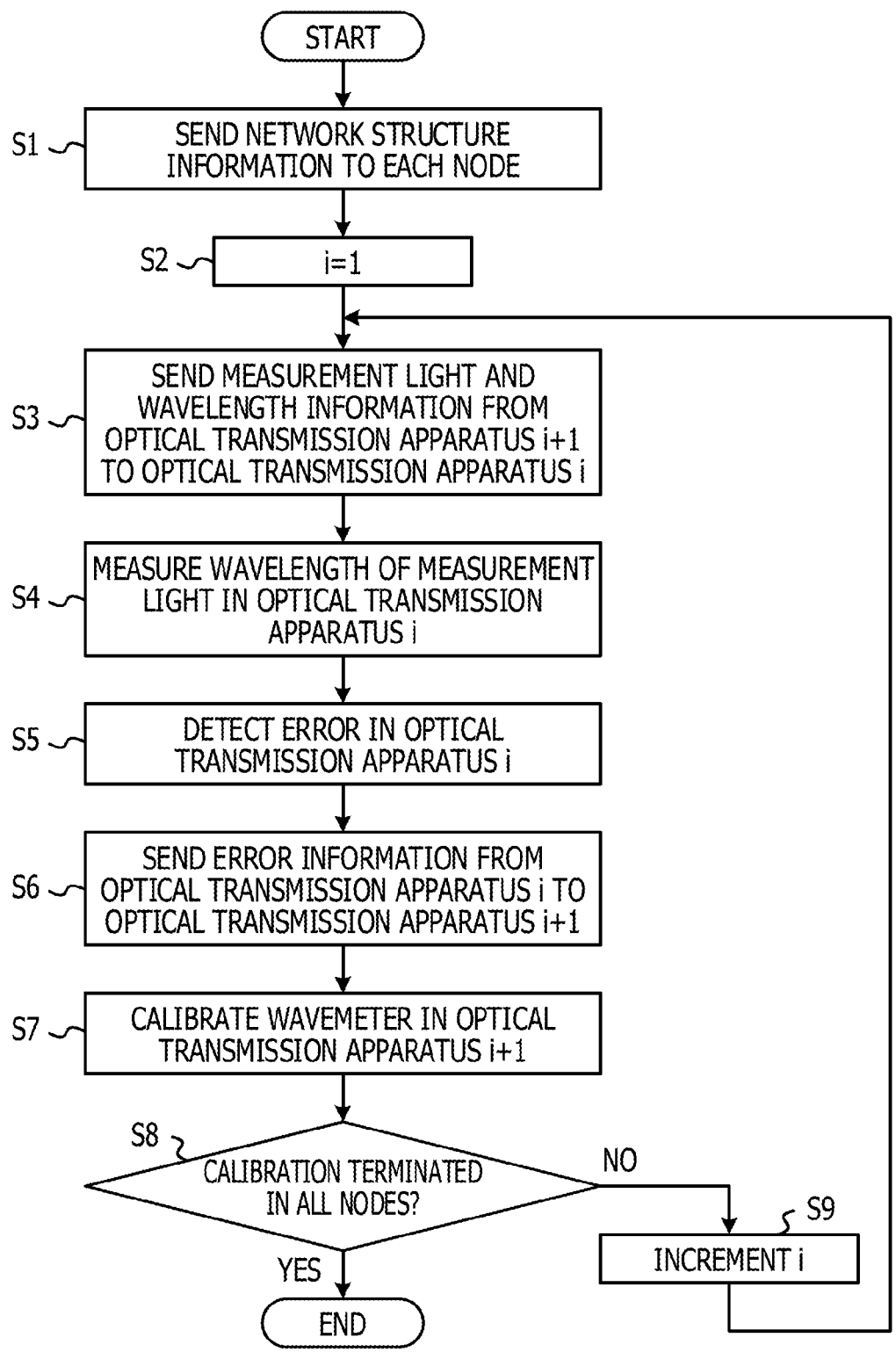
FIG. 3 illustrates an example of a wavelength calibration method.

FIG. 3 illustrates an example of a wavelength calibration method. Variable i identifies an optical transmission apparatus. The reference optical transmission apparatus, for example, the optical transmission apparatus 1 illustrated in FIG. 1, is represented by i=1. An optical transmission apparatus distant from the reference optical transmission apparatus by one hop is represented by i=2. In FIG. 1, the optical transmission apparatuses 2a, 2b, and 2c each are represented by i=2. An optical transmission apparatus distant from the reference optical transmission apparatus by two hops is represented by i=3. In FIG. 1, the optical transmission apparatuses 3a, 3b, and 3c each are represented by i=3. Similarly, an optical transmission apparatus distant from the reference optical transmission apparatus by n hops is represented by i=n+1. When the wavemeter 11 in optical transmission apparatus i+1 is to be calibrated, the wavemeter 11 in corresponding optical transmission apparatus i has been already calibrated.

In S1, the network management system 200 sends network structure information that represents the structure of the optical network system 100 to each node. The network structure information may include information that specifies a destination of measurement light for the optical transmission apparatus provided in each node. In S2, the network management system 200 initializes variable i.

In S3, optical transmission apparatus i+1 sends measurement light to optical transmission apparatus i specified by the network structure information. At that time, optical transmission apparatus i+1 also sends wavelength information to optical transmission apparatus i. The wavelength information represents the wavelength of measurement light measured with the wavemeter 11 in optical transmission apparatus i+1.

In S4, optical transmission apparatus i measures the wavelength of the measurement light received from optical transmission apparatus i+1. The wavemeter 11 in optical transmission apparatus i has already been calibrated. In S5, optical transmission apparatus i detects error between the wavelength obtained in S4 and the wavelength represented by the wavelength information received from optical transmission apparatus i+1. In S6, optical transmission apparatus i sends error information that represents the error detected in S5 to optical transmission apparatus i+1.

In S7, optical transmission apparatus i+1 calibrates the wavemeter 11 in the optical transmission apparatus i+1 according to the error information received from optical transmission apparatus i. Processing in S3 to S7 is executed for each optical transmission apparatus identified by i+1. In FIG. 1, for example, when i is 1, processing in S3 to S7 may be executed for each of the optical transmission apparatuses 2a to 2c. When i is 2, processing in S3 to S7 may be executed for each of the optical transmission apparatuses 3a to 3c.

In S8, it is decided whether the wavemeter 11 has been calibrated in all nodes in the optical network system 100. If there is an optical transmission apparatus in which the wavemeter 11 has not been calibrated, variable i is incremented in S9 and the processing in the wavelength calibration method returns to S3.

As described above, in the wavelength calibration method illustrated in FIGS. 2A, 2B, and 3, wavemeters 11 may be calibrated sequentially from the wavemeters 11 in the optical transmission apparatuses closest to the reference optical transmission apparatus. When variable i is 1, for example, the wavemeters 11 in the optical transmission apparatuses 2a to 2c distant from the reference optical transmission apparatus by one hope are calibrated. Therefore, secondary reference optical transmission apparatuses are obtained. When variable i is incremented to 2, the wavemeters 11 in the optical transmission apparatuses 3a to 3c distant from the reference optical transmission apparatus by two hopes are calibrated. At that time, the wavemeters 11 in the optical transmission apparatuses 3a to 3c are calibrated by using the secondary reference optical transmission apparatuses.

FIG. 4 illustrates an example of a wavelength calibration method. For example, the target wavelength of measurement light sent from optical transmission apparatus i+1 to optical transmission apparatus i may be 1552.52 nm. In this case, in optical transmission apparatus i+1, a control unit 13 adjusts the oscillation wavelength of a light source 12 so that a measurement result by the wavemeter 11 becomes 1552.52 nm. Light exiting from the light source 12 is sent to optical transmission apparatus i as measurement light. At that time, wavelength information that represents a measurement result ($\lambda(i+1)=1552.52$) by the wavemeter 11 in optical transmission apparatus i+1 is also sent to optical transmission apparatus i.

Optical transmission apparatus i measures the wavelength of the measurement light sent from optical transmission apparatus i+1. For example, the measurement result by the wavemeter 11 in optical transmission apparatus i is 1552.50 nm. The wavemeter 11 in optical transmission apparatus i may have already been calibrated. For example, optical transmission apparatus i may have been controlled to a state in which optical transmission apparatus i can operate as a reference optical transmission apparatus. The control unit 13 in optical transmission apparatus i detects error $\Delta\lambda$ between a value measured with the wavemeter 11 in optical transmission apparatus i and a value measured with the wavemeter 11 in optical transmission apparatus i+1. For example, $\Delta\lambda=0.02$ may be detected. Optical transmission apparatus i sends error information that represents the detected error $\Delta\lambda$ to optical transmission apparatus i+1.

In optical transmission apparatus i+1, the control unit 13 calibrates the wavemeter 11 according to the error information received from optical transmission apparatus i. Calibration of the wavemeter 11 may be performed by, for example, a computation to correct the measurement result by the wavemeter 11 according to the error information. In FIG. 4, a computation circuit in the wavemeter 11 is calibrated so that the wavemeter 11 outputs "measurement value−0.02". The wavemeter 11 may be calibrated by other methods. For example, operation conditions for the wavemeter 11, for example, a voltage to be applied, temperature and the like may be adjusted so that the measurement result by the wavemeter 11 is output in a state in which the measurement result has been corrected only by $\Delta\lambda$.

In FIG. 4, the wavelength information that represents the wavelength measured in optical transmission apparatus i+1 may be sent to optical transmission apparatus i. For example, optical transmission apparatus i+1 may notify optical transmission apparatus i of a grid number in an ITU-T frequency grid as the wavelength information. In this case, optical transmission apparatus i+1 creates measurement light with a target wavelength corresponding to a specified grid number k by using the wavemeter 11 and light source 12, and sends the measurement light to optical transmission apparatus i. Optical transmission apparatus i measures the wavelength of the measurement light sent from optical transmission apparatus i+1. Optical transmission apparatus i detects error between the measured wavelength and the target wavelength corresponding to the grid number k, and sends error information that represents the error to optical transmission apparatus i+1. The network management system 200 may notify optical transmission apparatus i and optical transmission apparatus i+1 of the grid number that represents the target wavelength of the measurement light.

For example, optical transmission apparatus i+1 may not transmit the wavelength information to optical transmission apparatus i. In this case, optical transmission apparatus i measures the wavelength of the measurement light sent from optical transmission apparatus i+1 and notifies optical transmission apparatus i+1 of a measurement result. Optical transmission apparatus i+1 detects error between the wavelength measured with the wavemeter 11 in optical transmission apparatus i+1 and the wavelength measured in optical transmission apparatus i and calibrates the wavemeter 11 according to the error.

Figure 5C:
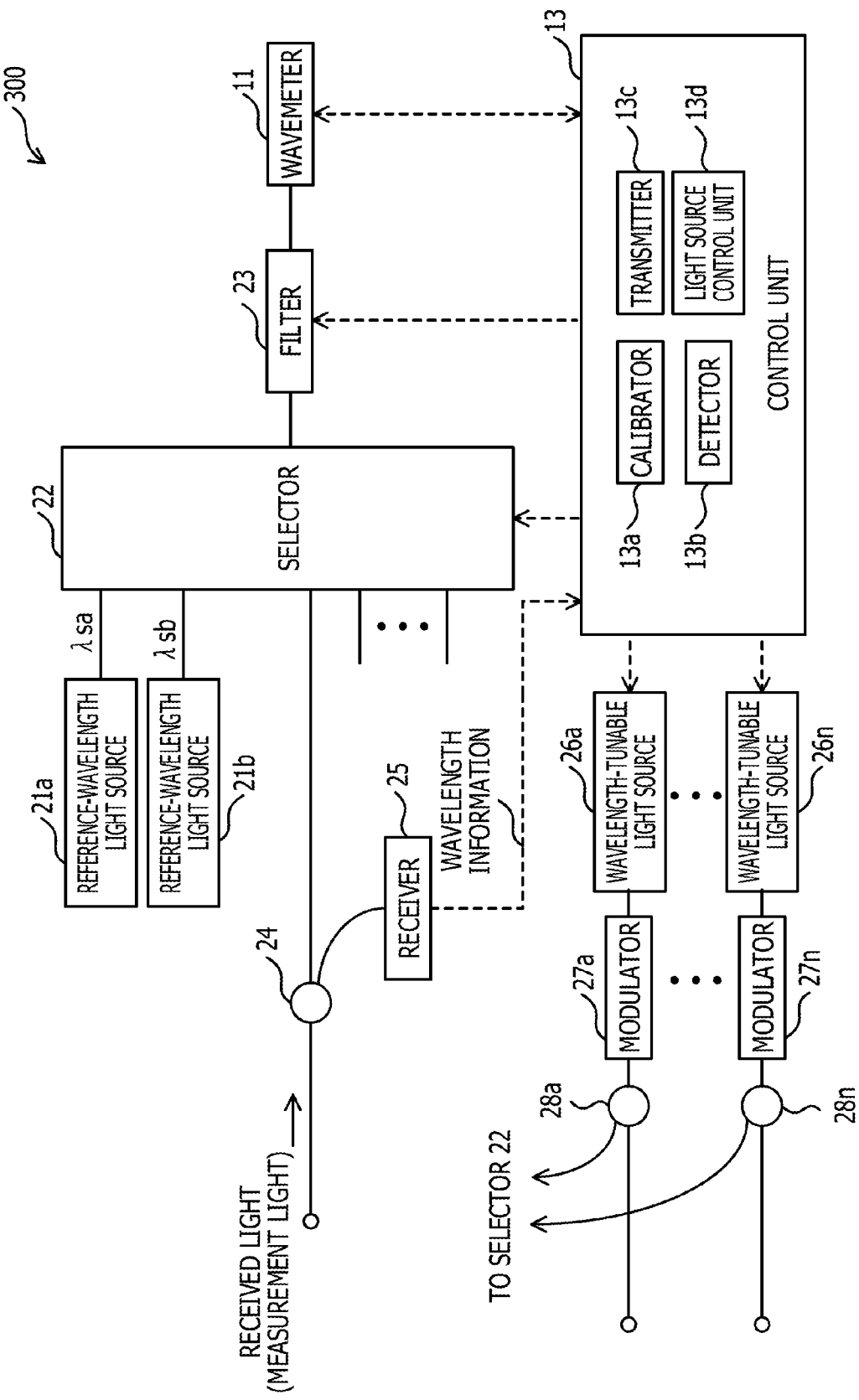

FIGS. 5A to 5C each illustrate an example of a reference optical transmission apparatus. The reference optical transmission apparatus 300 has reference-wavelength light sources 21a and 21b, a selector 22 (or an optical coupler 29), a wavelength-tunable optical filter 23, the wavemeter 11, the control unit 13, an optical branching unit 24, a receiver 25, wavelength-tunable light sources 26a to 26n, optical modulators 27a to 27n, and optical branching units 28a to 28n.

The reference-wavelength light sources 21a and 21b each may be a wavelength stabilizing light source that creates light with a stable wavelength. The wavelengths of light rays exiting from the reference-wavelength light sources 21a and 21b may differ from each other. For stability by the wavelength stabilizing light sources, a wavelength property in light absorption by a molecular gas or an atomic gas, for example, may be used as a physical wavelength reference value.

In FIG. 5A, the selector 22 selects light exiting from the reference-wavelength light sources 21a and 21b, light received from other optical transmission apparatuses, or light exiting from the wavelength-tunable light sources 26a to 26n, in response to a command from the control unit 13. When, for example, the wavemeter 11 measures the wavelength of received light, the selector 22 selects received light.

In FIG. 5B, the wavelength-tunable optical filter 23 filters light exiting from the optical coupler 29, in response to a command from the control unit 13. When, for example, the wavemeter 11 measures the wavelength of received light, the pass wavelength of the wavelength-tunable optical filter 23 is controlled so as to pass the received light. The wavemeter 11 measures the wavelength of the light selected by the wavelength-tunable optical filter 23.

As illustrated in FIG. 5C, both the selector 22 and the wavelength-tunable optical filter 23 may be placed. An optical cross talk may be reduced. In this case, control may be performed so that an optical signal is selected by the selector 22, and cross talk from light with other wavelengths is reduced by the wavelength-tunable optical filter 23.

In FIG. 5A, the optical branching unit 24 branches received light and leads branched light to the selector 22 and receiver 25. The receiver 25 extracts information transmitted by the received light. For example, if the received light is a modulated optical signal that transmits wavelength information, the receiver 25 demodulates the modulated optical signal and extracts the wavelength information.

The wavelength-tunable light sources 26a to 26n each create light with a wavelength specified by the control unit 13. The optical modulators 27a to 27n modulate the light created by the wavelength-tunable light sources 26a to 26n. The optical modulators 27a to 27n each create a modulated optical signal that transfer information created by the control unit 13. The modulated optical signals created by the optical modulators 27a to 27n are sent to other optical transmission apparatuses. For example, the optical modulators 27a to 27n each may be an example of an optical transmitter. The modulated optical signals created by the optical modulators 27a to 27n may be multiplexed into a WDM signal. The optical branching units 28a to 28n branch the modulated optical signals created by the optical modulators 27a to 27n and lead branched signals to the selector 22.

The control unit 13 includes a calibrator 13a, a detector 13b, a transmitter 13c, and a light source control unit 13d. The calibrator 13a calibrates the wavemeter 11. The detector 13b detects error between a wavelength measured with the wavemeter 11 and a wavelength represented by received wavelength information. The transmitter 13c sends error information that represents the error detected by the detector 13b to a corresponding optical transmission apparatus. The light source control unit 13d controls the wavelength-tunable light sources 26a to 26n. The control unit 13 may have other functions. The control unit 13 may be, for example, a processor system that includes a processor and a memory. In this case, the control unit 13 provides the functions of the calibrator 13a, detector 13b, transmitter 13c, and light source control unit 13d by executing given programs.

In the reference optical transmission apparatus 300, the wavemeter 11 is calibrated by using the reference-wavelength light sources 21a and 21b. At that time, the reference-wavelength light source 21a creates light with a wavelength of λsa and the reference-wavelength light source 21b creates light with a wavelength of λsb. The wavelengths λsa and λsb may have been stabilized. The control unit 13 calibrates the wavemeter 11 so that a value measured with the wavemeter 11 when light exiting from the reference-wavelength light source 21a is led to the wavemeter 11 becomes the wavelength λsa and a value measured with the wavemeter 11 when light exiting from the reference-wavelength light source 21b is led to the wavemeter 11 becomes the wavelength λsb. At that time, the wavemeter 11 is calibrated by the calibrator 13a. The reference optical transmission apparatus 300 may precisely measure the wavelength of measurement light sent from another optical transmission apparatus. In the description below, an optical transmission apparatus that sends measurement light may be referred to as a to-be-calibrated optical transmission apparatus.

In FIG. 5A, when the reference optical transmission apparatus 300 receives measurement light from a to-be-calibrated optical transmission apparatus, the selector 22 selects the measurement light and leads it to the wavemeter 11. The wavemeter 11 measures the wavelength of the measurement light. Since the wavemeter 11 in the reference optical transmission apparatus 300 has been calibrated, the measurement precision of the wavemeter 11 may be high. Wavelength information is transmitted. The receiver 25 extracts the wavelength information from the measurement light. For example, the wavelength information may include the wavelength of the measurement light measured in the to-be-calibrated optical transmission apparatus. For example, the wavelength information may include a grid number in the ITU-T frequency grid corresponding to the target wavelength of the measurement light created in the to-be-calibrated optical transmission apparatus. The detector 13b in the control unit 13 calculates error between the wavelength measured with the wavemeter 11 and the wavelength represented by the wavelength information.

FIG. 6 illustrates an example of a measurement error detection method. The wavemeter 11 in the reference optical transmission apparatus 300 has been calibrated by using λsa of light exiting from the reference-wavelength light source 21a and λsb of light exiting from the reference-wavelength light source 21b. Therefore, the reference optical transmission apparatus 300 may provide an ITU-T frequency grid.

The to-be-calibrated optical transmission apparatus sends measurement light with a wavelength λk corresponding to the grid number k to the reference optical transmission apparatus 300. At this point in time, the wavemeter 11 in the to-be-calibrated optical transmission apparatus has not been calibrated. Therefore, the wavelength of the measurement light sent from the to-be-calibrated optical transmission apparatus has error with respect to the wavelength λk, as illustrated in FIG. 6. The reference optical transmission apparatus 300 measures the measurement light with the calibrated wavemeter 11 and detects error Δλ. The error Δλ represents error in the wavelength of measurement light with respect to the wavelength λk. The error Δλ may correspond to the error of the wavemeter 11 in the to-be-calibrated optical transmission apparatus.

The control unit 13 creates error information that represents the error Δλ. The transmitter 13c sends the error information to the to-be-calibrated optical transmission apparatus. When, for example, the wavelength-tunable light source 26a is used to send the error information, the transmitter 13c gives the optical modulator 27a a driving signal that represents the error information. A modulated optical signal that represents the error information is created.

The oscillation wavelengths of the wavelength-tunable light sources 26a to 26n are controlled by using the calibrated wavemeter 11. When, for example, the oscillation waveform of the wavelength-tunable light source 26a is to be controlled, the selector 22 selects light exiting from the wavelength-tunable light source 26a and leads the light to the wavemeter 11. The light source control unit 13d in the control unit 13 controls the wavelength-tunable light source 26a so that a value measured with the wavemeter 11 comes close to a target wavelength. The wavelength of the light exiting from the wavelength-tunable light source 26a may be precisely controlled to the target wavelength.

Figure 7A:
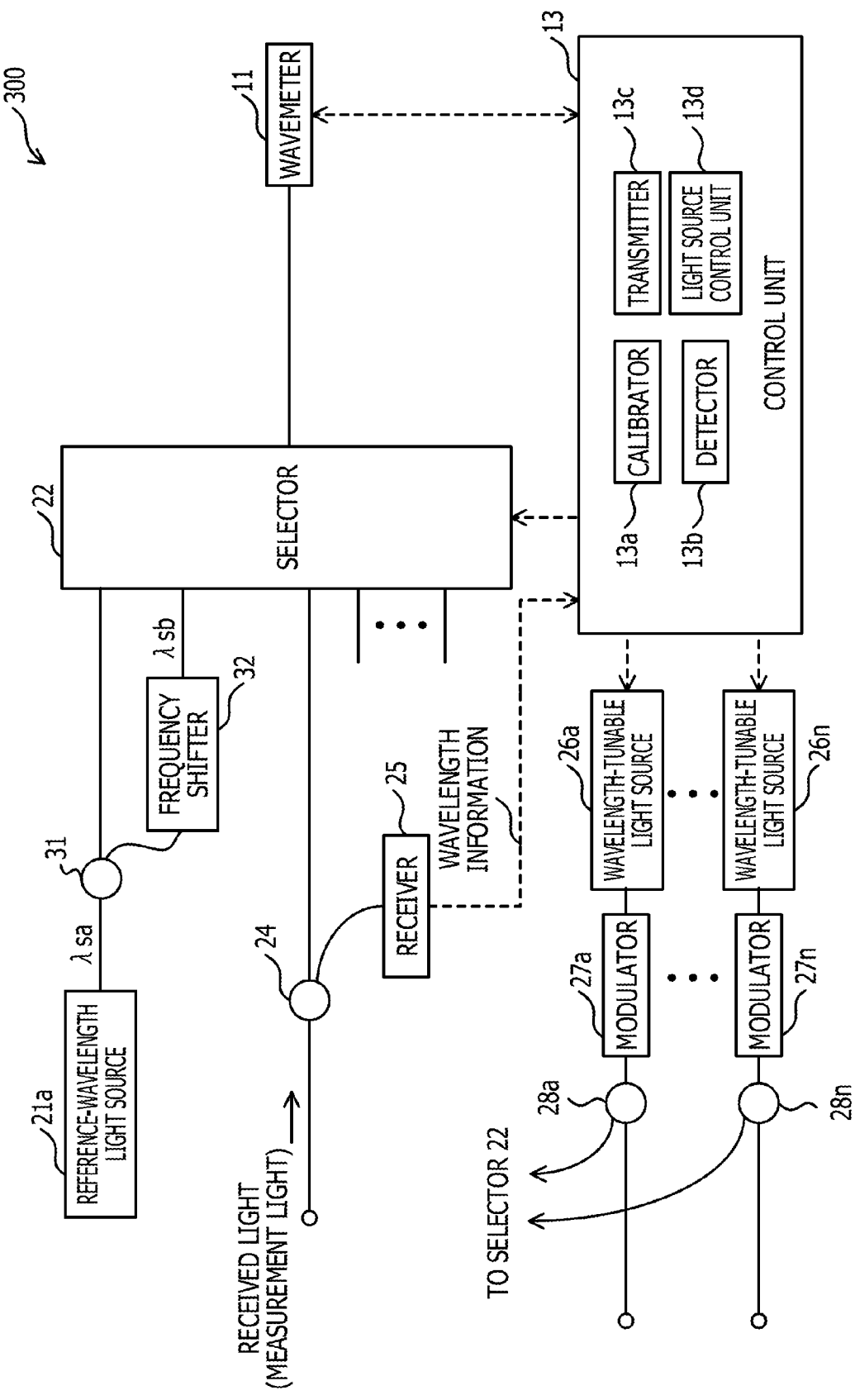

FIGS. 7A to 7C each illustrate an example of a reference optical transmission apparatus. The reference optical transmission apparatus 300 illustrated in FIGS. 7A to 7C has an optical branching unit 31 and a frequency shifter 32 instead of the reference-wavelength light source 21b. The optical branching unit 31 branches light exiting from the reference-wavelength light source 21a and leads branched light to the frequency shifter 32. The frequency shifter 32 shifts the optical frequency of the incident light. At that time, the frequency shifter 32 shifts the optical frequency of the incident light from λsa to λsb. In FIGS. 7A to 7C, other structures may be substantially the same as or similar to the relevant structures in FIGS. 5A to 5C.

Figure 8A:
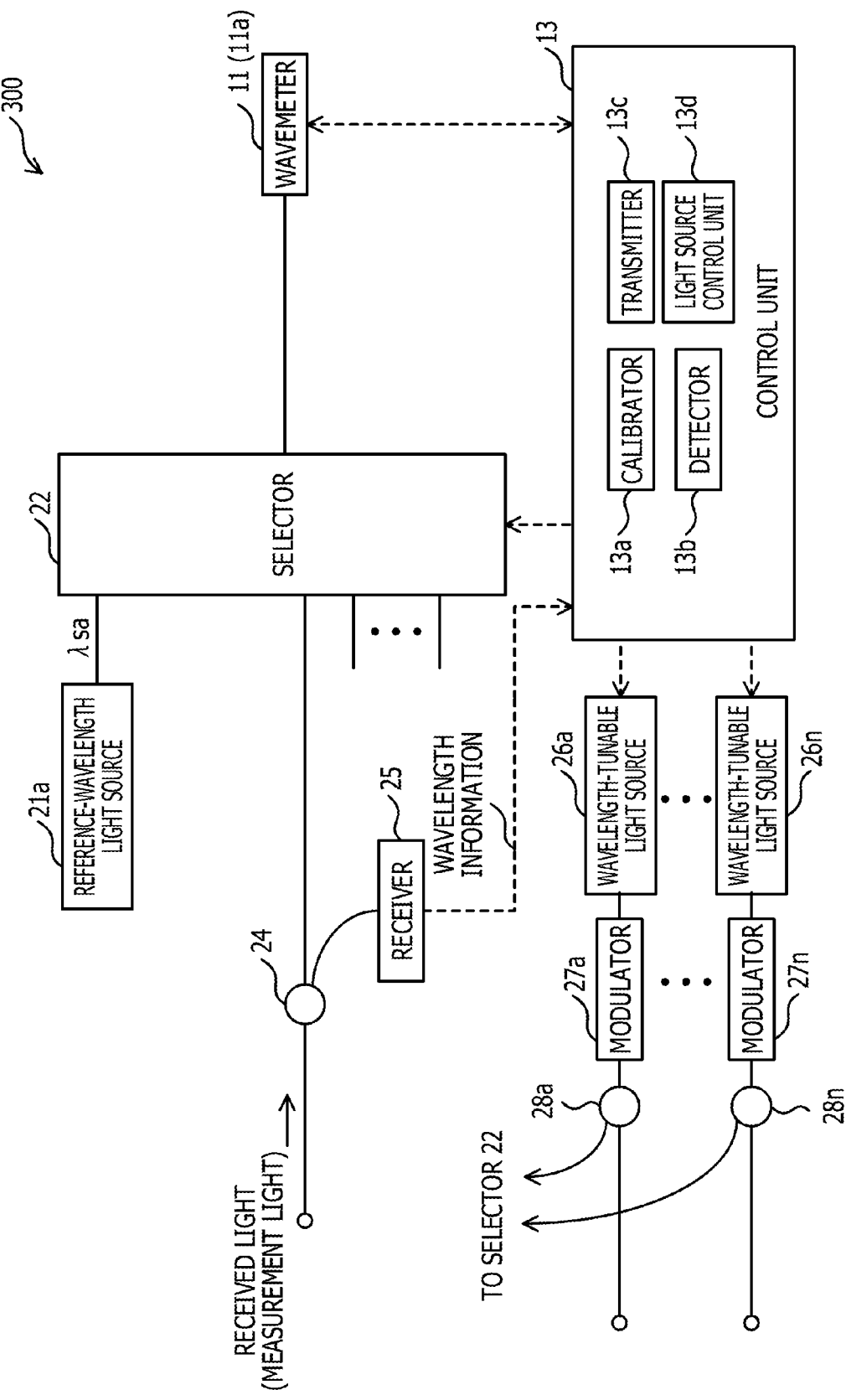
FIGS. 8A to 8C each illustrate an example of a reference optical transmission apparatus.
Figure 8B:
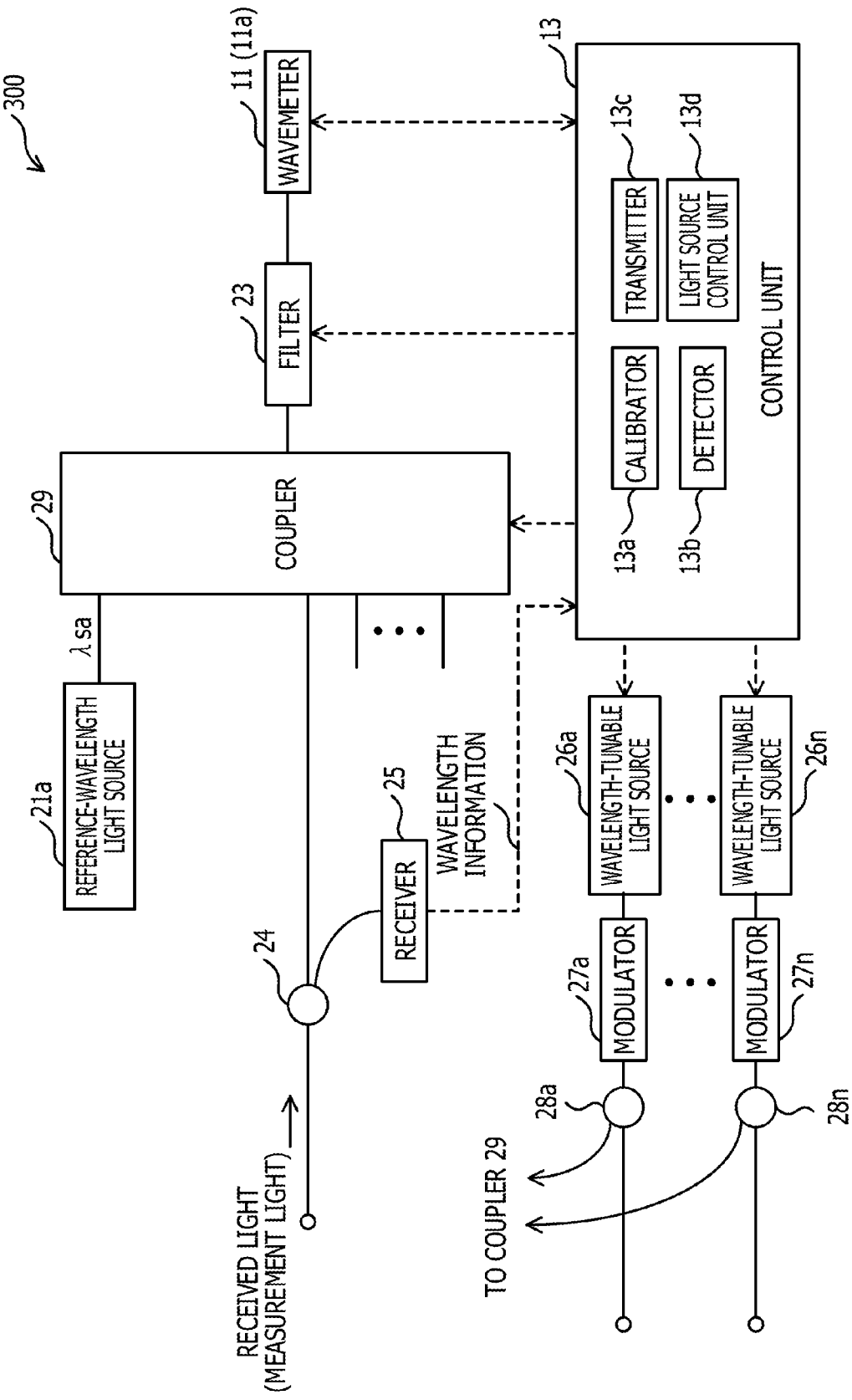
Figure 8C:
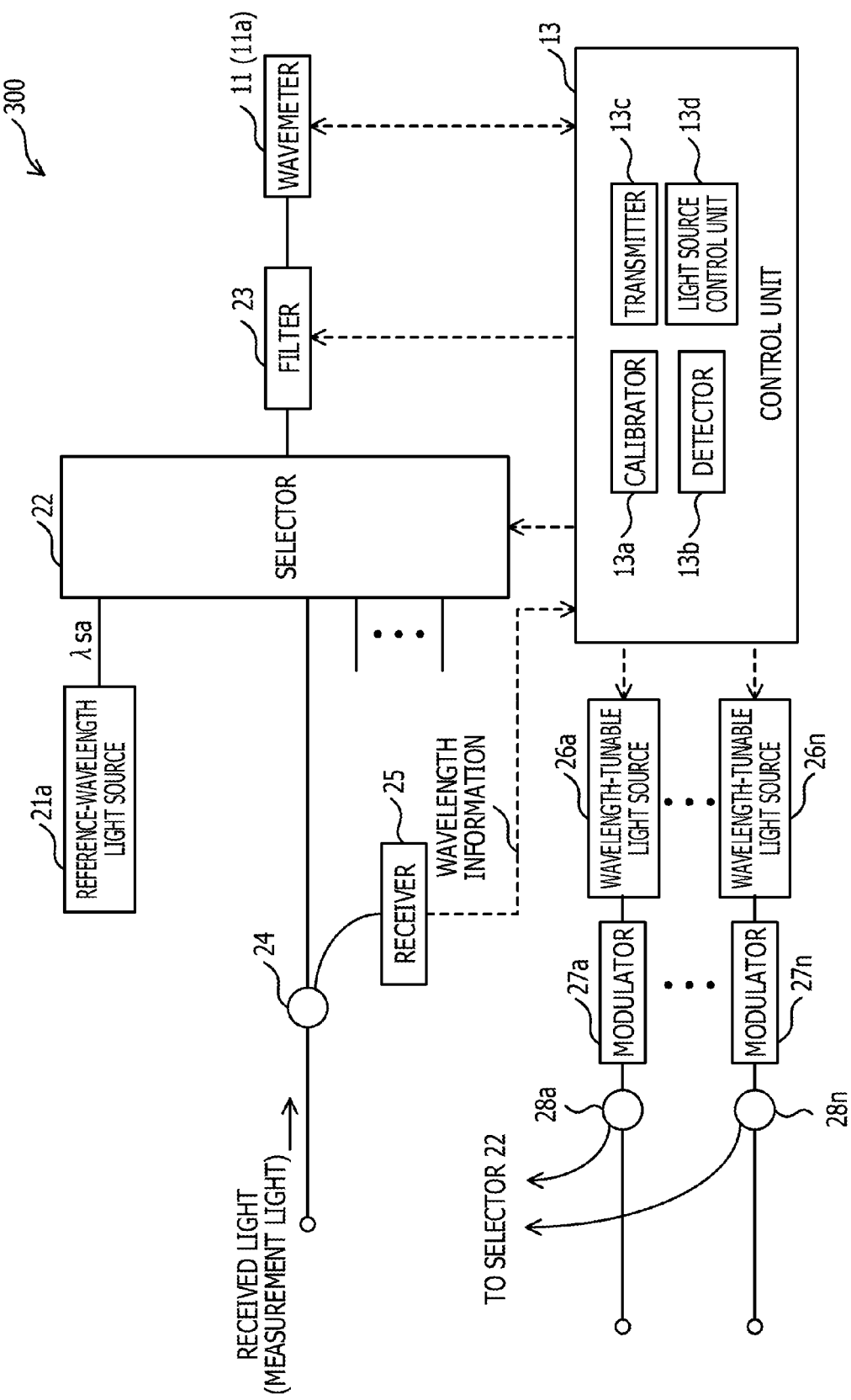

FIGS. 8A to 8C each illustrate an example of a reference optical transmission apparatus. In the reference optical transmission apparatus 300 illustrated in FIGS. 8A to 8C, the wavemeter 11 is calibrated by using one reference wavelength, for example, the wavelength λsa of light created by the reference-wavelength light source 21a. The reference optical transmission apparatus 300 has a wavemeter 11a that measures the wavelength of incident light by using an interference pattern. For example, the interference pattern of light exiting from the reference-wavelength light source 21a is detected by the wavemeter 11a and is stored in the control unit 13 as a reference interference pattern. When the reference optical transmission apparatus 300 receives measurement light, the wavemeter 11a detects the interference pattern of the measurement light. The detector 13b in the control unit 13 compares the interference pattern of the measurement light with the reference interference pattern to measure the wavelength of the measurement light. When an obtained measured value is compared with wavelength information from the receiver 25 to detect error Δλ. In FIGS. 8A to 8C, other structures may be substantially the same as or similar to the relevant structures in FIGS. 5A to 5C.

Figure 9B:
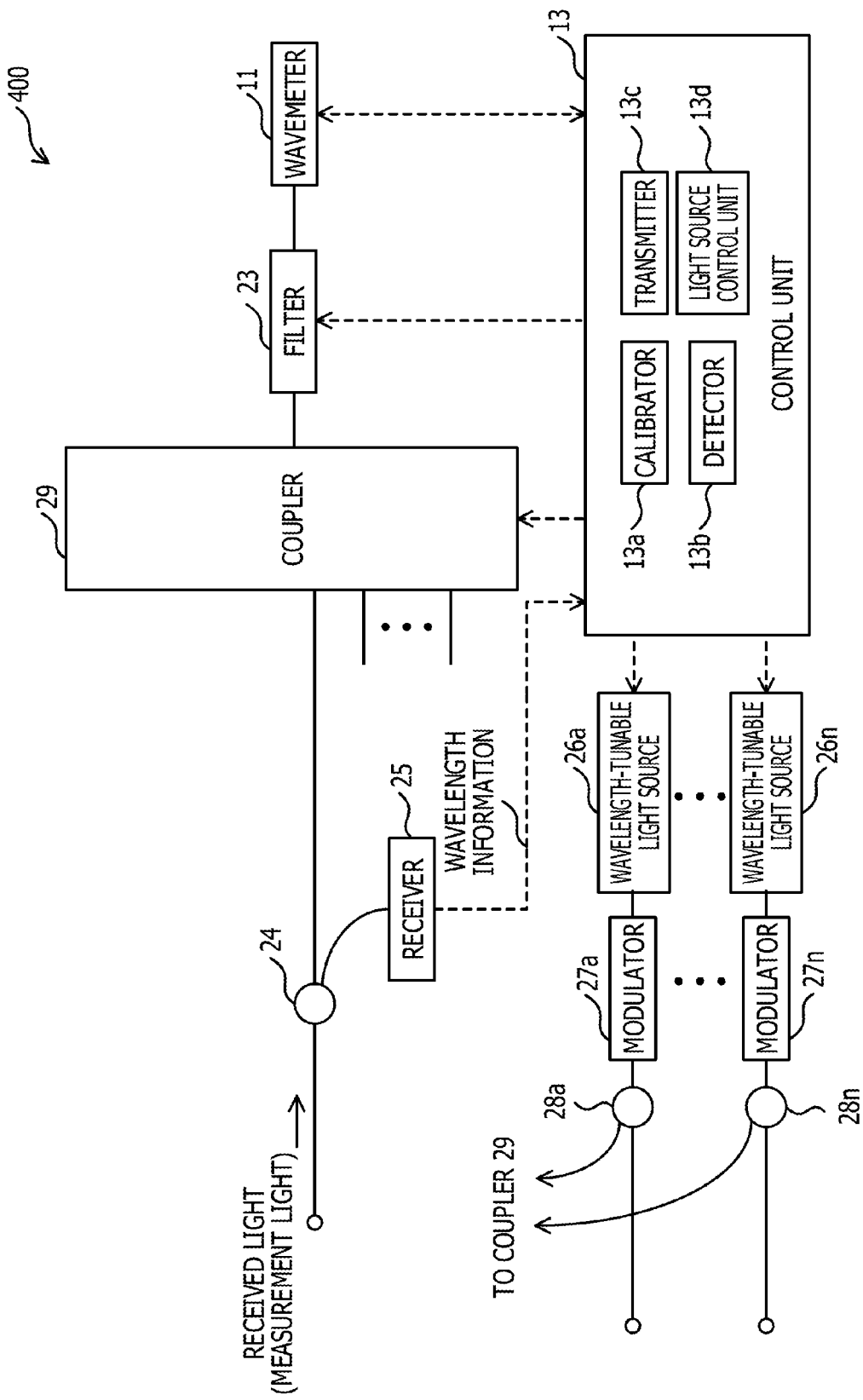

FIGS. 9A to 9C each illustrate an example of a reference optical transmission apparatus. In FIGS. 9A to 9C, an example of an optical transmission apparatus that lacks a reference-wavelength light source is illustrated. An optical transmission apparatus 400 that lacks a reference-wavelength light source has the selector 22, wavelength-tunable optical filter 23, wavemeter 11, control unit 13, optical branching unit 24, receiver 25, wavelength-tunable light sources 26a to 26n, optical modulators 27a to 27n, and optical branching units 28a to 28n, as with the reference optical transmission apparatus 300.

For example, the wavemeter 11 in the optical transmission apparatus 400 may be calibrated by using the reference optical transmission apparatus 300. For example, the wavemeter 11 may be calibrated by using the secondary reference optical transmission apparatuses, the tertiary reference optical transmission apparatuses, or the like. For example, the wavemeter 11 in the optical transmission apparatus 400 may be calibrated by using the reference optical transmission apparatus 300.

The optical transmission apparatus 400 creates measurement light by using any one of the wavelength-tunable light sources 26a to 26n. For example, the optical transmission apparatus 400 creates measurement light by using the wavelength-tunable light source 26a. The selector 22 selects light exiting from the wavelength-tunable light source 26a and leads the light to the wavemeter 11. The light source control unit 13d controls the wavelength-tunable light source 26a so that a value measured with the wavemeter 11 becomes a target wavelength. The wavelength-tunable light source 26a creates measurement light with the target wavelength. When the wavemeter 11 has not been calibrated, the wavelength of the measurement light has error with respect to the target wavelength. The target wavelength may be, for example, any wavelength in an ITU-T frequency grid.

The optical transmission apparatus 400 sends the created measurement light to the reference optical transmission apparatus 300. The transmitter 13c sends wavelength information that represents the wavelength of the measurement light measured with the wavemeter 11 in the optical transmission apparatus 400, to the reference optical transmission apparatus 300. For example, the transmitter 13c may send the wavelength information to the reference optical transmission apparatus 300 by using the measurement light. In this case, the transmitter 13c gives the optical modulator 27a a driving signal that represents the wavelength information. Measurement light that transmits the wavelength information is created.

The measurement light sent from the optical transmission apparatus 400 is received by the reference optical transmission apparatus 300. The reference optical transmission apparatus 300 measures the wavelength of the measurement light and creates error information. The error information is sent from the reference optical transmission apparatus 300 to the optical transmission apparatus 400.

In the optical transmission apparatus 400, the receiver 25 extracts the error information from the optical signal sent from the reference optical transmission apparatus 300. The calibrator 13a in the control unit 13 calibrates the wavemeter 11 by using the error information. A method of calibrating the wavemeter 11 may be, for example, the wavelength calibration method illustrated in FIG. 4. For example, the calibrator 13a calibrates a computation circuit in the wavemeter 11 so that error Δλ, indicated by the error information, in the value measured with the wavemeter 11 is compensated.

The optical transmission apparatus 400 may operate as a secondary reference optical transmission apparatus that has a calibrated wavemeter 11. The light source control unit 13d in the control unit 13 may control the oscillation frequencies of the wavelength-tunable light sources 26a to 26n by using the calibrated wavemeter 11. For example, the light source control unit 13d adjusts the oscillation wavelengths of the wavelength-tunable light sources 26a to 26n so that values measured with the calibrated wavemeter 11 become their corresponding target wavelengths. The optical transmission apparatus 400 may create optical signals with precisely controlled wavelengths.

According to the wavelength calibration method described above, an optical transmission apparatus that lacks a reference-wavelength light source calibrates the wavemeter in the optical transmission apparatus by sending measurement light to a reference optical transmission apparatus, a secondary reference optical transmission apparatus, a tertiary reference optical transmission apparatus, or the like and obtaining error information. An optical transmission apparatus having a calibrated wavemeter may operate as a reference optical transmission apparatus with respect to other optical transmission apparatuses. Therefore, even if a reference-wavelength light source is not provided in each node, the wavemeters in all optical transmission apparatuses in the optical network system may be calibrated. Therefore, communication may be carried out with optical signals having precisely controlled wavelengths, without increasing the total cost of the optical network system.

Only one optical transmission apparatus having a reference-wavelength light source may be provided in an optical network system, or two or more optical transmission apparatuses each of which has a reference-wavelength light source may be provided.

Figure 10:
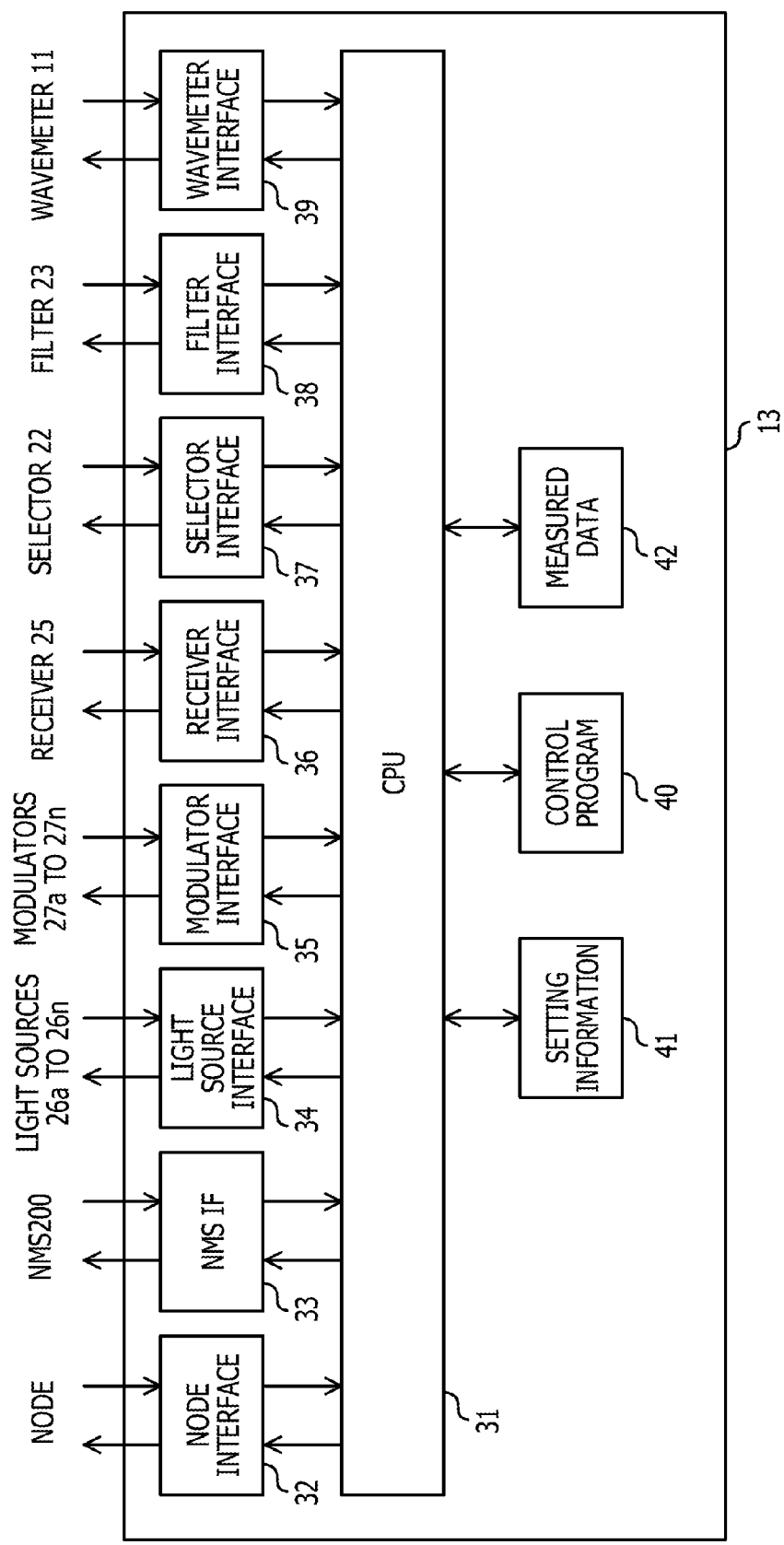
FIG. 10 illustrates an example of a control unit.

FIG. 10 illustrates an example of a control unit. The control unit illustrated in FIG. 10 may be mounted in the reference optical transmission apparatus 300 or optical transmission apparatus 400. The control unit 13 has a CPU 31, a node interface 32, an NMS interface 33, a light source interface 34, a modulator interface 35, a receiver interface 36, a selector interface 37, a filter interface 38, and a wavemeter interface 39.

The CPU 31 controls the operation of the optical transmission apparatus by executing a given program. For example, the CPU 31 may provide the functions of the calibrator 13a, detector 13b, transmitter 13c, and light source control unit 13d by executing a control program 40. Through the interfaces (32 to 39), the CPU 31 may send a command or data to their corresponding devices and may obtain information from their corresponding devices through the interfaces.

The node interface 32 provides an interface to and from an optical transmission apparatus provided in an own node or in another node. The NMS interface 33 provides an interface to and from the network management system 200. The light source interface 34 provides an interface to and from the wavelength-tunable light sources 26a to 26n. In the reference optical transmission apparatus 300, the light source interface 34 also provides an interface to and from the reference-wavelength light sources 21a and 21b. The modulator interface 35 provides an interface to and from the optical modulators 27a to 27n. The receiver interface 36 provides an interface to and from the receiver 25. The selector interface 37 provides an interface to and from the selector 22. The filter interface 38 provides an interface to and from the wavelength-tunable optical filter 23. The wavemeter interface 39 provides an interface to and from the wavemeter 11.

The control unit 13 may include a memory. Various data and information are stored in the memory. A setting information storage unit 41 stores setting information given from the network management system 200. The setting information may include information that represents the wavelength of each wavelength-tunable light source in adjacent nodes. A measured data storage unit 42 may store results in measurements by the wavemeter 11.

An optical transmission apparatus having a calibrated wavemeter may operate as a reference optical transmission apparatus. For example, as illustrated in FIG. 2A, the wavemeters 11 in the optical transmission apparatuses 2a to 2c each are calibrated by using the optical transmission apparatus 1. As illustrated in FIG. 2B, the optical transmission apparatuses 2a to 2c may operate as a reference optical transmission apparatus with respect to the optical transmission apparatuses 3a to 3c. Each optical transmission apparatus may calibrate the wavemeter by using the optical transmission apparatus in an adjacent node.

Figure 11A:
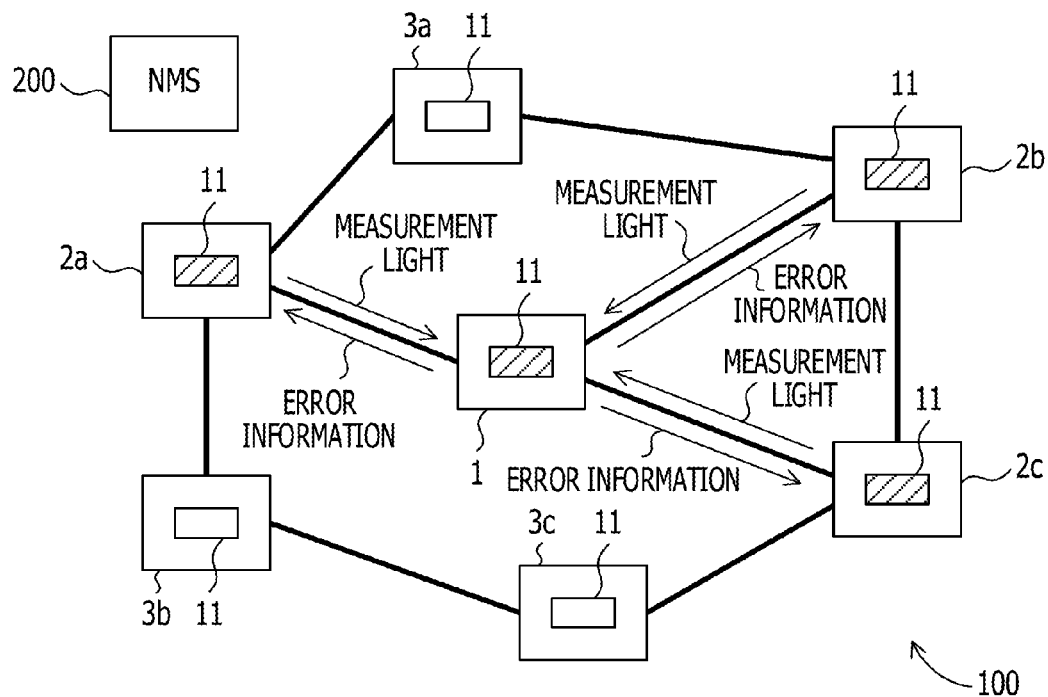
FIGS. 11A and 11B each illustrate an example of a wavelength calibration method.
Figure 11B:
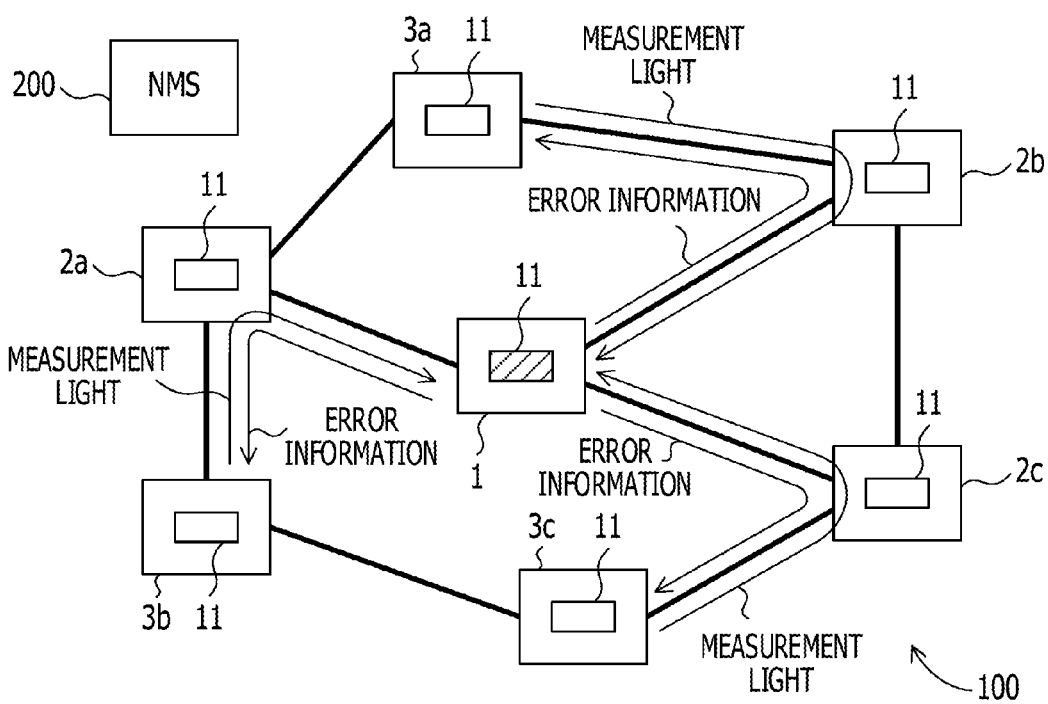

Each optical transmission apparatus may calibrate the wavemeter in the own optical transmission apparatus by using a reference optical transmission apparatus having a reference-wavelength light source, for example, the optical transmission apparatus 1 illustrated in FIG. 1. FIGS. 11A and 11B each illustrate an example of a wavelength calibration method. For example, the optical transmission apparatuses 2a to 2c adjacent to the optical transmission apparatus 1 calibrate the wavemeter 11 in the optical transmission apparatuses 2a to 2c, respectively, by using the optical transmission apparatus 1, as illustrated in FIG. 11A. The wavelength calibration method illustrated in FIG. 11A may be substantially the same as the wavelength calibration method described above.

For example, an optical transmission apparatus not adjacent to the optical transmission apparatus 1 may also calibrate the wavemeter 11 in the own optical transmission apparatus by using the optical transmission apparatus 1. For example, as illustrated in FIG. 11B, the optical transmission apparatuses 3a to 3c calibrate the relevant wavemeter 11 in the optical transmission apparatuses 3a to 3c, respectively, by using the optical transmission apparatus 1. In this case, the optical transmission apparatuses 2a to 2c forward measurement light sent from the optical transmission apparatuses 3a to 3c to the optical transmission apparatus 1 without terminating the transmission of the measurement light.

Figure 12:
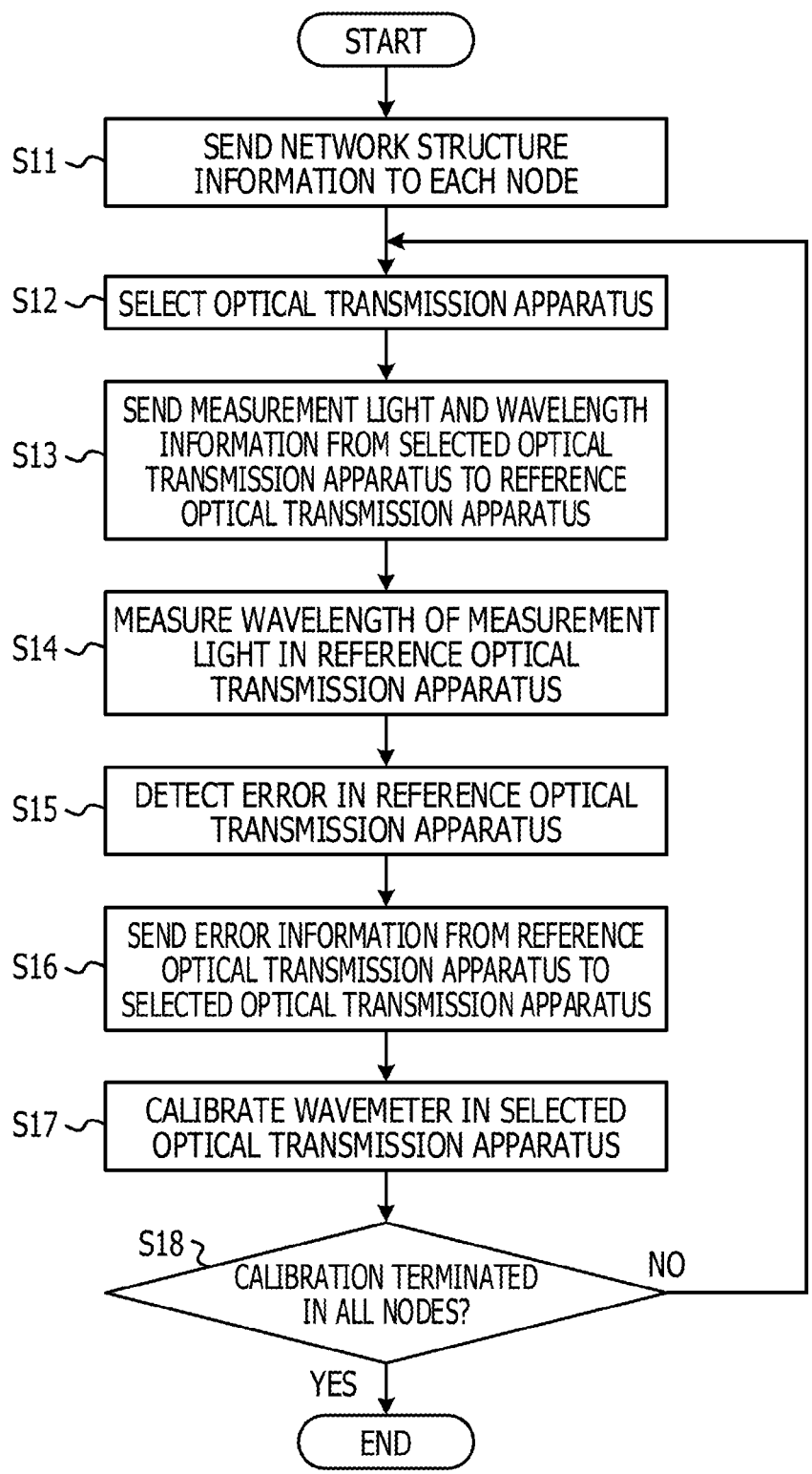
FIG. 12 illustrates an example of a wavelength calibration method.

FIG. 12 illustrates an example of a wavelength calibration method. In S11, the network management system 200 sends network structure information that represents the structure of the optical network system 100 to each optical transmission apparatus. The network structure information may include information that specifies a destination of measurement light for each optical transmission apparatus. In S12, the network management system 200 selects one optical transmission apparatus other than the reference optical transmission apparatuses.

Processing in S13 to S17 may be similar to S3 to S7 illustrated in FIG. 3. For example, in FIG. 12, each optical transmission apparatus calibrates the wavemeter by using a reference optical transmission apparatus having a reference-wavelength light source.

In S13, the selected optical transmission apparatus sends measurement light to a reference optical transmission apparatus. At that time, the selected optical transmission apparatus also sends wavelength information to the reference optical transmission apparatus. The wavelength information is transmitted to the reference optical transmission apparatus by, for example, using the measurement light. The wavelength information may be transmitted to the reference optical transmission apparatus separately from the measurement light. The network management system 200 may notify the reference optical transmission apparatus of the wavelength information. Optical transmission apparatuses positioned between the selected optical transmission apparatus and the reference optical transmission apparatus forward the corresponding measurement light to the reference optical transmission apparatus, without terminating the transfer of the measurement light.

In S14, the reference optical transmission apparatus measures the wavelength of the measurement light received from the selected optical transmission apparatus. In S15, the reference optical transmission apparatus detects error between the wavelength obtained in S14 and the wavelength represented by the wavelength information. In S16, the reference optical transmission apparatus sends the error information that represents the error detected in S15 to the selected optical transmission apparatus. In S17, the selected optical transmission apparatus calibrates the wavemeter 11 in the selected optical transmission apparatus, according to the error information received from the reference optical transmission apparatus.

In S18, it is decided whether the wavemeters 11 in all optical transmission apparatuses in the optical network system have been calibrated. If there is an optical transmission apparatus in which the wavemeter 11 has not been calibrated, the processing in the wavelength calibration method returns to S12.

Figure 13A:
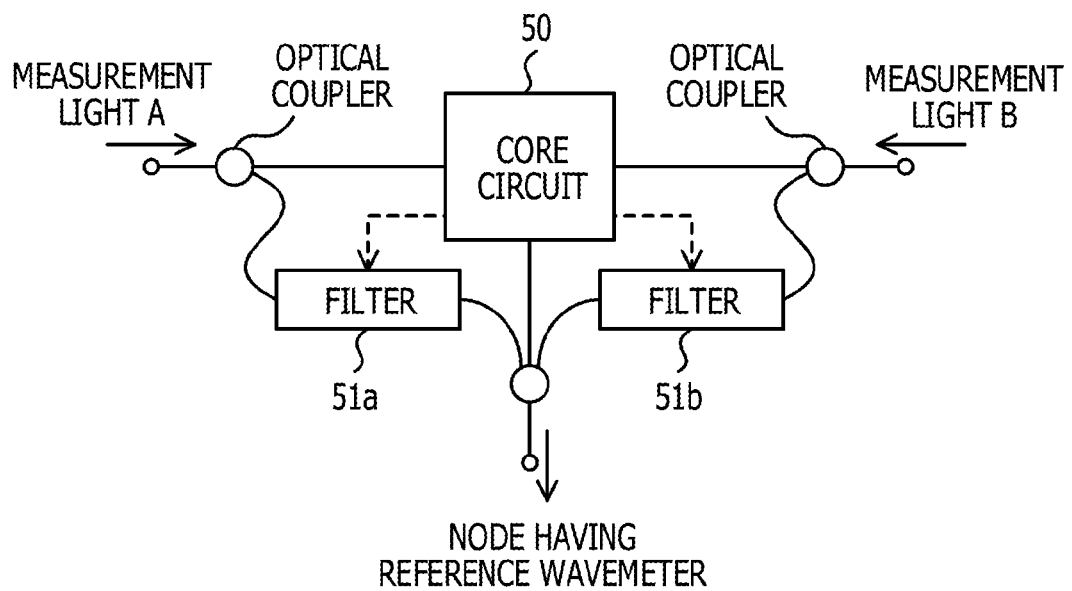
FIGS. 13A and 13B each illustrate an example of forwarding measurement light.
Figure 13B:
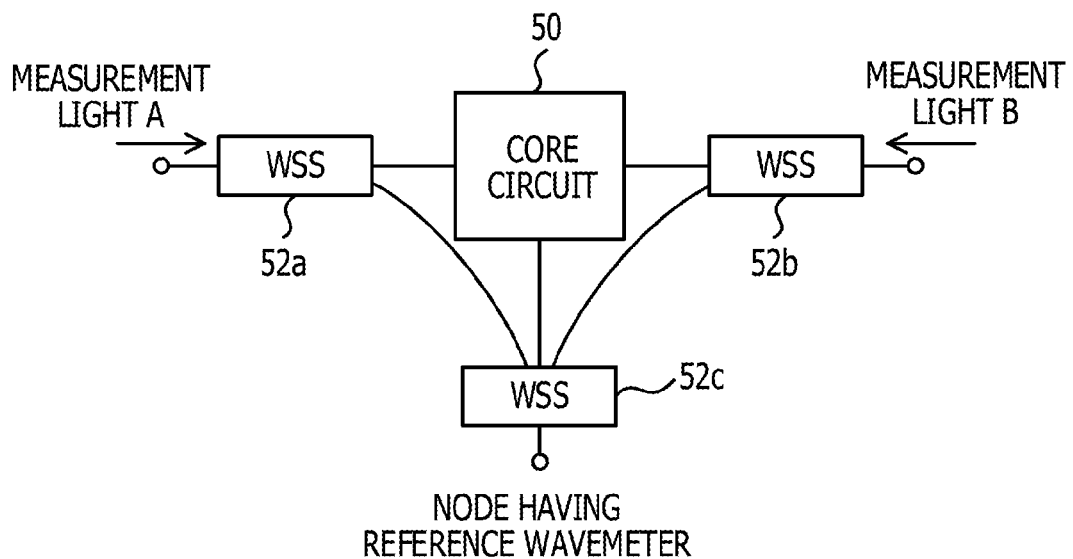

FIGS. 13A and 13B each illustrate an example of forwarding measurement light. In FIGS. 13A and 13B, a core circuit 50 may correspond to, for example, a node body part that internally includes the selector 22, wavelength-tunable optical filter 23, wavemeter 11, control unit 13, optical branching unit 24, receiver 25, wavelength-tunable light sources 26a to 26n, optical modulators 27a to 27n, optical branching units 28a to 28n, and the like illustrated in FIG. 9C.

In FIG. 13A, a function of forwarding measurement light may be provided by using wavelength-tunable band-pass optical filters.

When, for example, measurement light A is forwarded to a node having a reference wavemeter, the core circuit 50 controls the center wavelength of the pass-band of a wavelength-tunable band-pass optical filter 51a to the wavelength of the measurement light A. When measurement light B is forwarded to the node having a reference wavemeter, the core circuit 50 controls the center wavelength of the pass-band of a wavelength-tunable band-pass optical filter 51b to the wavelength of the measurement light B.

In FIG. 13B, a function of forwarding measurement light is provided by using wavelength selective switches (WSSes). When, for example, measurement light A is forwarded to a node having a reference wavemeter, the core circuit 50 controls a WSS 52*a* and a WSS 52*c* so that the wavelength of the measurement light A is selected. When measurement light B is forwarded to the node having a reference wavemeter, the core circuit 50 controls a WSS 52*b* and the WSS 52*c* so that the wavelength of the measurement light B is selected. In a structure in which WSSes are provided in the core circuit 50, functions corresponding to FIG. 13B may be provided by using WSSes. All or any of the light sources may be a laser diode (LD).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transmission apparatus, comprising:
    a reference-wavelength light source configured to generate reference light;
    a reference wavemeter configured to be calibrated by using the reference light;
    a receiver configured to receive measurement light transmitted from a light source included in another optical transmission apparatus including a wavemeter which is used to adjust the light source in such a manner that the light source outputs the measurement light with a target wavelength and wavelength information about the measurement light; and
    a controller, wherein the controller configured to:
        detect error between a wavelength of the measurement light detected by using the reference wavemeter, and the target wavelength included in the wavelength information transmitted from the another optical transmission apparatus; and
        send error information that represents the error to the another optical transmission apparatus to calibrate the wavemeter at the another optical transmission apparatus based on the error information.

2. The optical transmission apparatus according to claim 1, further comprising:
    a selector configured to select the reference light or the measurement light and output a selected light to the reference wavemeter.

3. The optical transmission apparatus according to claim 2, further comprising:
    a variable-wavelength light source configured to generate light that has a wavelength specified by the controller and to be selected by the selector.

4. An optical transmission apparatus, comprising:
    a first wavelength-tunable light source;
    a first wavemeter which is used to adjust the first wavelength-tunable light source in such a manner that the first wavelength-tunable light source outputs first measurement light with a target wavelength; and
    a first controller,
    wherein the first controller configured to:
        send the first measurement light and first wavelength information that represents the target wavelength of the first measurement light to a reference optical transmission apparatus;
        receive first error information that represents error between a wavelength of the first measurement light measured with a reference wavemeter in the reference optical transmission apparatus and the target wavelength included in the first wavelength information; and
        calibrate the first wavemeter according to the error information.

5. The optical transmission apparatus according to claim 4, wherein the first controller controls the first wavelength-tunable light source by using a calibrated first wavemeter.

6. The optical transmission apparatus according to claim 4, wherein the first controller sends the first wavelength information to the reference optical transmission apparatus by using the first measurement light.

7. A wavelength calibration method comprising:
    sending, from a wavelength-tunable light source included in a second optical transmission apparatus including a second wavemeter, which is used to adjust the light source in such a manner that the wavelength-tunable light source outputs first measurement light with a target wavelength, in an optical network system to a first optical transmission apparatus including a first wavemeter in the optical network system, the first measurement light and first wavelength information including the target wavelength of the first measurement light;
    measuring, in the first optical transmission apparatus, a wavelength of the first measurement light with the first wavemeter;
    detecting, in the first optical transmission apparatus, first error between the measured wavelength and the target wavelength included in the first wavelength information;
    sending first error information including the first error from the first optical transmission apparatus to the second optical transmission apparatus; and
    calibrating, in the second optical transmission apparatus, the second wavemeter according to the first error information.

8. The wavelength calibration method according to claim 7, wherein a wavelength of the wavelength-tunable light source provided in the second optical transmission apparatus is adjusted by using a calibrated second wavemeter.

9. The wavelength calibration method according to claim 7, further comprising:
    sending, after a calibration of the second wavemeter, from a third optical transmission apparatus having a third wavemeter in the optical network system to the second optical transmission apparatus, second measurement light measured with the third wavemeter and second wavelength information including a first wavelength of the second measurement light;
    measuring, in the second optical transmission apparatus, a second wavelength of the second measurement light with the second wavemeter;
    detecting, in the second optical transmission apparatus, second error between the second wavelength and the first wavelength;
    sending second error information including the second error from the second optical transmission apparatus to the third optical transmission apparatus; and calibrating, in the third optical transmission apparatus, the third wavemeter according to the second error information.

10. The wavelength calibration method according to claim 7, further comprising:
sending, from a third optical transmission apparatus having a third wavemeter coupled to the first optical transmission apparatus through the second optical transmission apparatus in the optical network system to the first optical transmission apparatus through the second optical transmission apparatus, second measurement light measured with the third wavemeter and second wavelength information including a first wavelength of the second measurement light; measuring, in the first optical transmission apparatus, a second wavelength of the second measurement light with the first wavemeter;
detecting, in the first optical transmission apparatus, second error between the second wavelength and the first wavelength;
sending second error information representing the second error, from the first optical transmission apparatus to the third optical transmission apparatus through the second optical transmission apparatus; and
calibrating, in the third optical transmission apparatus, the third wavemeter according to the second error information.

11. The optical transmission apparatus according to claim 1, wherein the receiver is configured to receive respective measurement lights transmitted from a plurality of optical transmission apparatuses including the another optical transmission apparatus and the respective wavelength information about the respective measurement lights, each of the plurality of optical transmission apparatuses includes respective wavemeters, and
wavelengths included in the respective wavelength information about the respective measurement lights are different with each other.

12. The optical transmission apparatus according to claim 11, wherein the wavemeters are calibrated based on the respective error information in parallel.

13. The optical transmission apparatus according to claim 4, wherein the calibrating the first wavemeter according to the first error information is performed in parallel with a calibration of a second wavemeter in another optical transmission apparatus including:
a second wavelength-tunable light source configured to generate second measurement light; and
a second controller configured to:
send second wavelength information that represents a second wavelength of the second measurement light to the reference optical transmission apparatus;
receive second error information that represents error between a wavelength of the second measurement light measured with the reference wavemeter in the reference optical transmission apparatus and the second wavelength included in the second wavelength information; and
calibrate the second wavemeter according to the second error information.

14. The optical transmission apparatus according to claim 13, wherein the first wavelength is different from the second wavelength.

* * * * *